(12) United States Patent
Doyle

(10) Patent No.: US 6,616,701 B2
(45) Date of Patent: Sep. 9, 2003

(54) METHOD AND APPARATUS FOR IDENTIFYING FEATURES OF MULTIDIMENSIONAL IMAGE DATA IN HYPERMEDIA SYSTEMS

(75) Inventor: Michael D. Doyle, Wheaton, IL (US)

(73) Assignee: Eolas Technologies, Inc., Wheaton, IL (US)

( * ) Notice: Subject to any disclaimer, the term of this patent is extended or adjusted under 35 U.S.C. 154(b) by 0 days.

(21) Appl. No.: 09/825,570

(22) Filed: Apr. 3, 2001

(65) Prior Publication Data

US 2001/0030651 A1 Oct. 18, 2001

Related U.S. Application Data

(63) Continuation of application No. 09/316,496, filed on May 21, 1999.
(60) Provisional application No. 60/086,620, filed on May 23, 1998.

(51) Int. Cl.[7] .............................................. G06F 17/00
(52) U.S. Cl. ..................... 715/501.1; 345/424; 345/850; 345/852
(58) Field of Search ................................. 345/427, 501, 345/850, 852, 424; 707/501.1; 715/501.1

(56) References Cited

U.S. PATENT DOCUMENTS

| | | | | |
|---|---|---|---|---|
| 4,847,604 A | * | 7/1989 | Doyle .......................... 345/180 |
| 5,473,747 A | * | 12/1995 | Bird et al. ................... 345/848 |
| 5,678,015 A | * | 10/1997 | Goh ............................ 345/848 |
| 5,708,845 A | * | 1/1998 | Wistendahl et al. ...... 707/501.1 |
| 5,737,553 A | * | 4/1998 | Bartok ........................ 345/764 |
| 5,912,670 A | * | 6/1999 | Lipscomb et al. .......... 345/634 |
| 5,918,012 A | * | 6/1999 | Astiz et al. ................. 345/744 |
| 5,923,324 A | * | 7/1999 | Berry et al. ................ 345/852 |
| 5,940,538 A | * | 8/1999 | Spiegel et al. .............. 345/473 |
| 5,978,816 A | * | 11/1999 | Sakaguchi et al. ........ 707/501.1 |
| 5,982,372 A | * | 11/1999 | Brush, II et al. ........... 345/418 |
| 5,987,509 A | * | 11/1999 | Portuesi ...................... 725/113 |
| 5,990,941 A | * | 11/1999 | Jackson et al. ............. 382/293 |
| 6,031,541 A | * | 2/2000 | Lipscomb et al. .......... 345/427 |
| 6,052,100 A | * | 4/2000 | Soltan et al. ................. 345/84 |
| 6,057,854 A | * | 5/2000 | Davis, Jr. et al. ........... 345/433 |
| 6,097,393 A | * | 8/2000 | Prouty et al. ............... 345/852 |

(List continued on next page.)

FOREIGN PATENT DOCUMENTS

| | | | | |
|---|---|---|---|---|
| GB | 2298769 A | * | 9/1996 | |
| GB | 2316257 A | * | 2/1998 | |
| GB | 2316258 A | * | 2/1998 | |
| JP | 10-091814 | * | 4/1998 | ........... G06T/17/40 |

OTHER PUBLICATIONS

Williams, B., et al., "An Internet Atlas of Mouse Development," Computerized Medical Imaging and Graphics, vol. 20 No. 6, pp. 443–447.*

Doyle, M., et al., "The Visible Embryo Project: Embedded Program Objects for Knowledge Access, Creation, & Management . . . " Comp. Medical Imaging & Graphics, vol. 20 No. 6, pp. 423–431, Dec. 1996.*

Anonymous. QuickTime VR Tutor, Apr. 29, 1997, downloaded from www.devworld.apple.com on Aug. 8, 1998, pp. 1–65.*

English Translation of JP 10–91814 (Lipscomb Apr. 1998), "Method & Device for Generating & Displaying Hotlinks in Panoramic 3–D. Scenes", trans. by Ralph McEleroy Co. (Wash. DC) p p. 1–32.*

*Primary Examiner*—Heather R. Herndon
*Assistant Examiner*—Bieneman A Charles
(74) *Attorney, Agent, or Firm*—Charles E. Krueger

(57) ABSTRACT

In a method and apparatus for identifying features of multidimensional image data in hypermedia systems a multidimensional image, secondary image map and object index associate a program action with each object defined in an image.

1 Claim, 4 Drawing Sheets

U.S. PATENT DOCUMENTS 6,121,966 A * 9/2000 Teodosio et al. ............ 345/854
6,204,849 B1 * 3/2001 Smith ......................... 345/854
6,230,167 B1 * 5/2001 Lipscomb et al. .......... 345/854
6,285,374 B1 * 9/2001 Falcon ........................ 345/856
6,308,144 B1 * 10/2001 Bronfeld et al. ............ 345/420
6,337,683 B1 * 1/2002 Gilbert et al. ............... 345/418
6,362,817 B1 * 3/2002 Powers et al. ............... 345/428
6,380,958 B1 * 4/2002 Guendel et al. ............. 345/427

* cited by examiner

| IDENTIFIER | PROGRAM ACTION |
| --- | --- |
| 00000000000000000000000 | Applet 1 |
| 00000000000000000000001 | URL1 |
| 00000000000000000000010 | TIF1 |
| ⋮ | ⋮ |
| 11111111111111111111111 | Applet N |

Figure 4

METHOD AND APPARATUS FOR IDENTIFYING FEATURES OF MULTIDIMENSIONAL IMAGE DATA IN HYPERMEDIA SYSTEMS

CROSS REFERENCE TO RELATED APPLICATION(S)

This is a continuation of U.S. patent application Ser. No. 09/316,496, now abandoned, filed May 21, 1999, which claims priority from a Provisional Application Serial No. 60/086,620, now abandoned, filed May 23, 1998.

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present invention relates to a method and apparatus for identifying features of multidimensional image data in hypermedia systems.

BACKGROUND INFORMATION

The World Wide Web ("Web" or "Internet") provides a simple mechanism, called an image map or ISMAP, for linking two-dimensional spatial data (e.g., images) to related symbolic information such as Universal Resource Locators (URLs). Image maps are a simple technology that link simple polygonal regions within images, often referred to as hotspots (e.g., a graphically defined area in an image), to the locations of data objects on the Internet via a hyperlink. Web image maps currently are the standard mechanism used for creating graphically attractive user interfaces to Web pages. For example, an image could be made into an image map by assigning hotspots to each region of interest on the image. Unfortunately, the standard polygon-based ISMAP technology used in most Web image map systems can only work with simple polygon maps, and becomes either intolerably slow or totally unusable for mapping high-resolution images with large numbers of irregularly shaped objects, such as, for example, objects in the medical anatomy image data which comprise the National Library of Medicine's Visible Human Project.

U.S. Pat. No. 4,847,604, which is hereby expressly incorporated by reference, describes a method and apparatus to provide additional information concerning a feature of a displayed image by pointing to the location of the feature. The '604 patent provides for the correlation of particular locations in the image with the additional information for two-dimensional images. A need exists to provide such correlation for multidimensional images.

SUMMARY OF THE INVENTION

A multi-dimensional object indexing system allows many discrete objects to be mapped within a single multi-dimensional dataset. A secondary spatial image of an original image is correlated using a multi-dimensional coordinate value to provide an object index for each object defined in the original multi-dimensional image.

BRIEF DESCRIPTION OF THE DRAWINGS

FIG. 4 illustrates an exemplary database table according to an exemplary embodiment of the present invention.

DETAILED DESCRIPTION OF THE INVENTION

Figure 1:
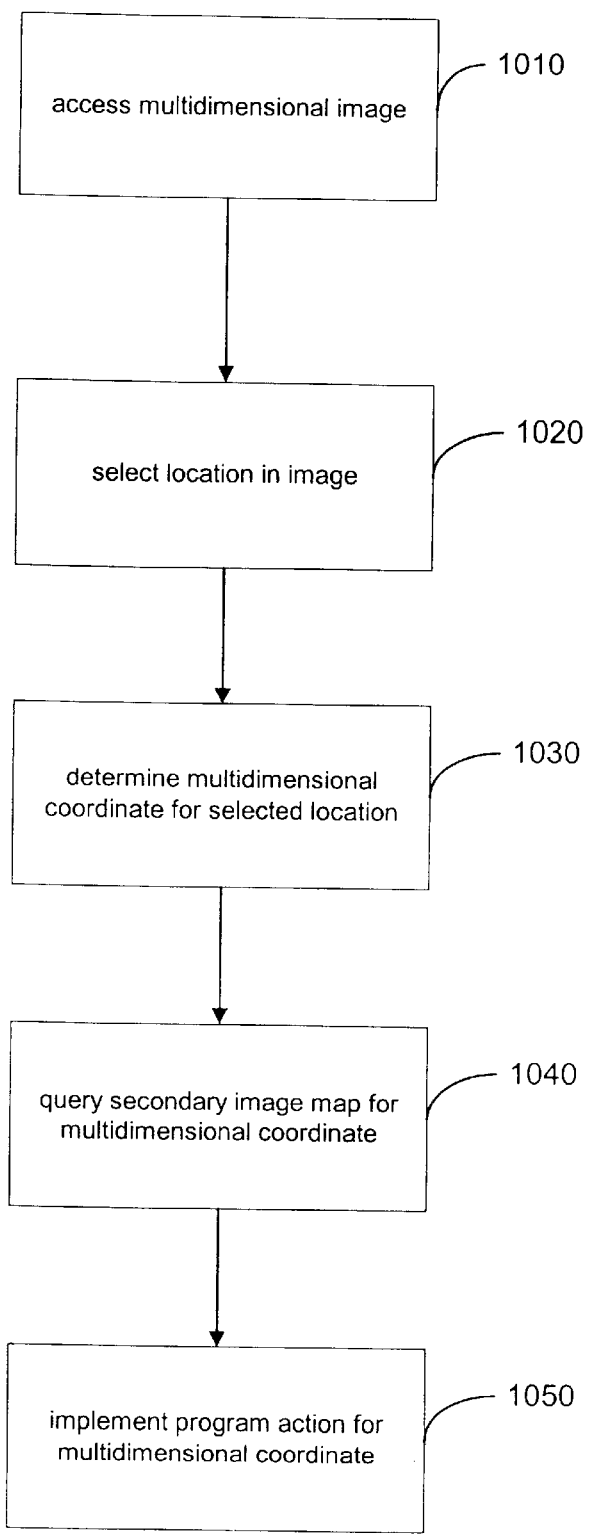
FIG. 1 illustrates a flowchart for a method of identifying features of multidimensional image data according to an exemplary embodiment of the present invention.

FIG. 1 illustrates an exemplary flowchart for a method of identifying features of multidimensional image data according to an exemplary embodiment of the present invention. For example, at 1010 an image is accessed, such as a multi-dimensional image or animated GIF image on a web page. At 1020, a location in the image is indicated, for example by clicking on a part of the image using a mouse or other interface device, the image having been preprocessed to be an image map as described, for example, in the '604 Patent or as described below with regard to FIG. 2.

At 1030, a multidimensional coordinate location is determined for the location identified at 1020. For example, the image map may be a two-dimensional representation (e.g., x-y) of a three dimensional image, such as a three dimensional medical anatomy image maintained by the National Library of Medicine's Visible Human Project. The two-dimensional representation may reflect a particular third dimension view. For example, a particular slice of the image may be shown to a user thus providing a predetermined third dimension, or z-value, for the representation of the image displayed to the user. Accordingly, selecting a particular location on the representation defines the x and y values for the location and the third dimension is already defined. As a result, the multi-dimensional coordinates of the selected image location can be determined.

In an alternative exemplary embodiment of the present invention, the selection of a image for correlation with additional information may be a multi-step process. For example, an image of an entire anatomical body could be presented to a user and a general area of the image selected, such as the chest, head or abdomen. In response, a detailed view of the related region could be displayed to the user. The user would then select a particular location in the image and receive additional information related to the selected location. As noted above, the images presented to the user will generally be two-dimensional representations viewed on a predetermined or selectable third dimension. In addition, the original image can be manipulated, rotated or sliced for viewing in a preferred orientation. The image location eventually selected by a user, regardless of the orientation and display of the image, will correspond to a particular multi-dimensional coordinate which can be correlated with additional information as described below.

Alternatively, the image map could be a video clip having x and y values for each frame of the video clip and the third dimension, in this case time, would be determined by the particular frame of the video clip. Thus, multi-dimensional values can be determined for an indicated location. The present invention is not limited, however, to three dimensions as four or more dimensions can be processed according to exemplary embodiments of the present invention. For example, a three dimensional image dataset that changes through time would provide for four dimensions (e.g., x, y, z and time).

At 1040 a secondary map is queried for the determined multi-dimensional value where, for example, a given x,y,z coordinate in the original image data corresponds to an homologous x,y,z location in the secondary "map" of, for example, 24-bit voxels (e.g., three-dimensional pixels). The 24-bit voxel found at that location in the secondary map then acts as a unique 24-bit object index for the image feature in the original data. At 1050, the system then performs a database table lookup for that 24-bit index in order to find the related descriptive text information or "hot data," which may be in the form of, for example, HTML code, a URL pointer to a remote Web resource, or Tcl-based applet code. Using the 24-bit voxel allows as many as 16 million discrete objects to be mapped within a single three-dimensional dataset. If desired, even more objects could be mapped in the dataset by using 32-bit voxels. Using an exemplary embodiment of the present invention, animated GIFs, AVIs and MPEGs can be processed to provide enhanced functionality to a Web page to extend image capabilities to multi-dimensional datasets.

Figure 2:
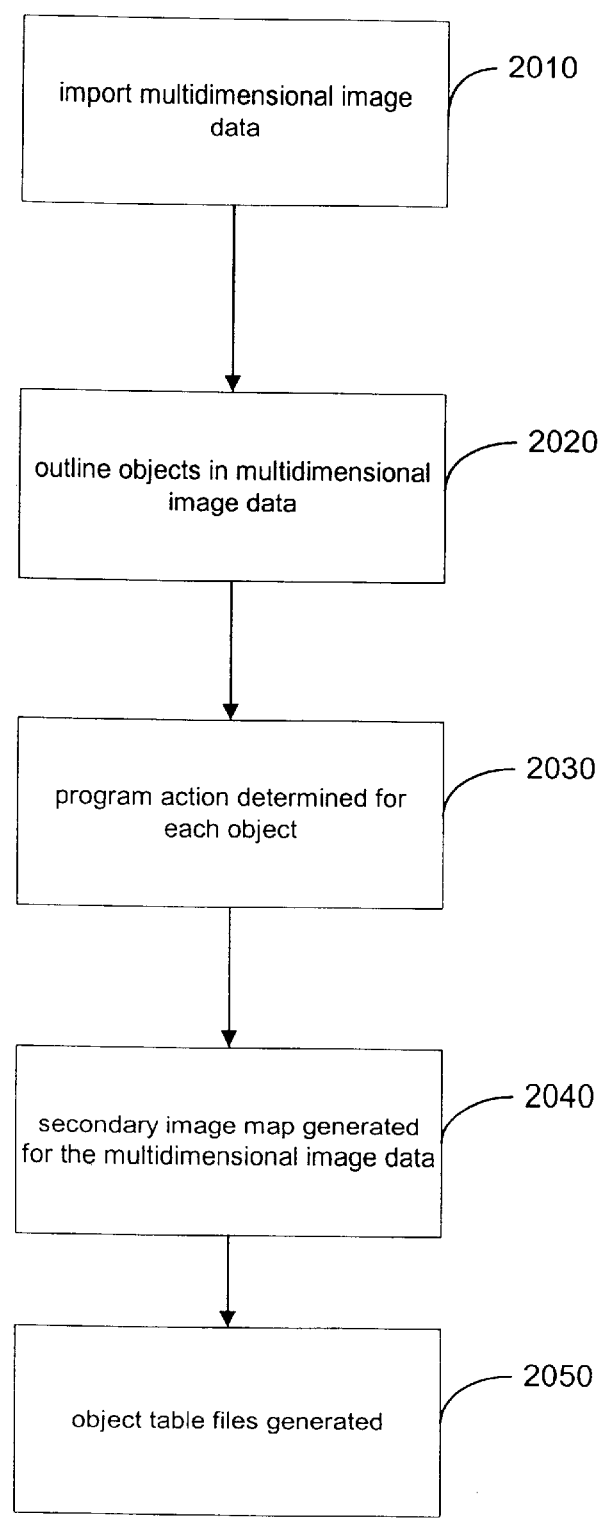
FIG. 2 illustrates a flowchart for a method of processing multi-dimensional image data according to an exemplary embodiment of the present invention.

FIG. 2 illustrates an exemplary flowchart for a method of processing image data according to an exemplary embodiment of the present invention. At 2010, multi-dimensional image data is imported. The image data can be, for example, a GIF file of an image or a JPEG or MPEG file of images. At 2020, objects in the image data (e.g., hotspots) are, for example, interactively outlined. An exemplary method for outlining the objects is described in the '604 Patent although other conventional approaches known in the art may be used. The outlining of hotspots requires the user be presented, for example, a two dimensional representation of a multi-dimensional image as described above. Thus, additional dimensions can be predefined for the two-dimensional views presented to a user. At 2030, a program action is determined and associated for each object in the image data. For example, the program action can display explanatory text related to the object in the image or provide a link to a particular Web page. As described above, the program action can be in the form of, for example, HTML code, a URL pointer to a remote Web resource, or Tcl-based applet code.

At 2040, a secondary image map is generated for the image data. The secondary image map provides, for example, a spatial index of the image with equivalent spatial dimensions as the original image. The secondary image map utilizes, for example, unique 24-bit voxels to associate a unique 24-bit identifier with the pixels in an object outlined at 2020. Alternatively, pixels within an object can have different unique identifiers defining, for example, sub-regions in the object having associated program actions. Other object indices could be used instead of the 24-bit voxels, however, such as a list of polygons or some other indice that correlates a coordinate value in the original image with the secondary image map. The 24-bit values are, for example, arbitrarily assigned to groups of pixels or individual pixels in the object.

According to an exemplary embodiment of the present invention, each pixel in the object can be an independently addressable hotspot, including for multi-dimensional images. For example, for each mapped multi-dimensional image on a Web page, the Web server hosting the Web page stores the secondary image map. Each pixel or group of pixels in a hotspot defined for the image corresponds to, for example, a flat area of 24-bit color in the secondary image map, as each object pixel or group of pixels owns a unique 24 bit color in the secondary image map. While the primary (original) image is displayed to the user, the secondary image may is generally not shown to the user, although there may be circumstances in which it is desirable to show the secondary image map. At 2050, object table files are generated to associate the pixels in each object with the program action identified at 2030. The object table can have the form of, for example, a database lookup table indexed by the 24-bit voxels to find the corresponding program action for each pixel.

Figure 3:
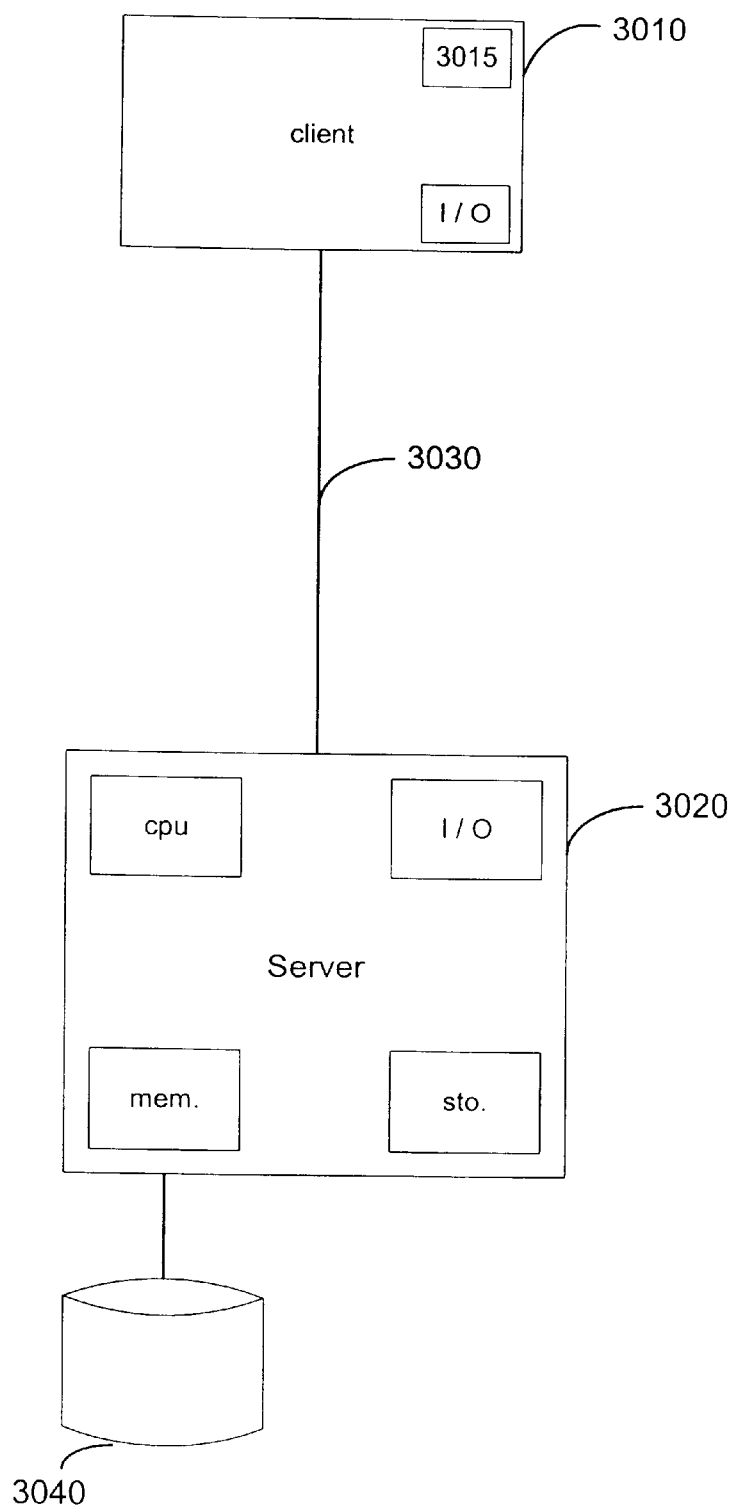
FIG. 3 illustrates an exemplary system for identifying features of multi-dimensional image data according to an exemplary embodiment of the present invention.

Exemplary operation of the method for identifying features in multidimensional image data is as follows and as illustrated in FIG. 3. When a user clicks on a location of a multi-dimensional image in an image map in a Web page via a Web browser, the Web browser sends the, for example, x-y coordinates of that location to the Web server. Web browser 3015 can include, for example, conventional Internet browser software such as NETSCAPE® browser software operating in a conventional desktop personal computer 3010, as illustrated in FIG. 3. Web browser 3015 transmits the x-y coordinates to Web server 3020 via a communications link 3030, such as a LAN, WAN, fiber optic, wireless or other conventional computer network communications link. Web server 3020 includes, for example, a conventional NT or SUN Microsystems server and processes the x-y coordinates to generate a multi-dimensional coordinate value.

As described above, the third dimension may be predetermined as a function of the image presented to the user such as a particular "slice" of an image or a frame of a video clip. Once the multi-dimensional coordinate value is determined, the Web server 3020 launches a, for example, Java-based CGI program to find the corresponding multi-dimensional coordinate value in the secondary image map to determine the unique 24 bit value corresponding to the pixel clicked on in the image by the user. The CGI program then sends the 24-bit value to a, for example, Tcl-based server which takes the 24-bit value and fetches a record from the database lookup table for the corresponding program action to be taken, or the Web server 3020 itself processes the 24-bit value and uses the value as an index into database 3040 coupled to Web server 3020 to determine the program action to be performed. The program action is relayed back by the Web server 3020 for display to the user at client computer 3010, usually in a frame next to the image map. The program action can include, for example, browser redirection, encapsulated HTML, dynamic HTML and downloading and running full-frame applets in the user's Web page. Other program actions can be performed as well. FIG. 4 illustrates an exemplary database table associating a program action 4020 with each identifier 4010 in the database table, such as each unique 24-bit value.

Thus, according to an embodiment of the present invention, individual pixels or voxels in objects of multi-dimensional image data can be automatically linked to desired program actions in contrast to prior art systems which are limited to indexing of two-dimensional Web images.

The additional dimension added to the indexing of image maps can vary as a function of the type of image data displayed. Thus, for example, the additional dimension could be the z-coordinate for three-dimensional images or the time dimension for video clips or both for three-dimensional image data recorded over time as well as additional dimensions. Like the multi-dimensional image data, the secondary image map according to an exemplary embodiment of the present invention can have n-dimensions. In addition, the individual pixels in an object of a multi-dimensional image can be individually addressable. Moreover, by adding a dimension to a standard image map request protocol in accordance with an exemplary embodiment of the present invention, the display of an image on a client side of computer network can be independent of the server performing the object identification in the image, thus allowing the capabilities provided by the present invention to be implemented using conventional personal computers or even less powerful devices such as handheld computers or smartphones.

An exemplary implementation of the method according to an embodiment of the present invention is illustrated below and uses a small (30K) Tcl-based client applet which downloads and runs within the users Web browser page. For example, when a user accesses a web page with multidimensional image data to be viewed, an applet such as the applet described below would be automatically downloaded to the client computer. The applet would then, for example, fetch the appropriate image data, secondary image map and object index table and download the data to the client computer. The client computer web browser then interacts with the download applet to view the image data, for example in the manner described above. For example, the Tcl applet converts the image data back to a viewable image. If the image is a video clip, for example, then the video clip would be displayed to the user. The applet program then waits for the user to click on a location in the video clip. When the user clicks a location, the frame number is determined and the x-y location of the click is determined as described previously, thereby enabling a multidimensional coordinate location for the click to be determined to use as an index into the secondary image map, from which the program action can be determined via an object index table.

```
Tcl/Tk (v. 8.0) Source code for a zMap client-side applet (requires the Tcl Netscape
plug-in v. 2.0 from Sun Microsystems, or equivalent):
    # Eolas Client-side zMap Applet
    # Copyright (©) 1997, 1998 Eolas Technologies Incorporated. All rights reserved
    #Distributed only as a part of the Eolas zMap Cs V 1.0 package
    #For more information on Eolas' zMap products, see http://zmap.eolas.com
    policy outside
    package require http
################
#   zMap procedures

################
proc zmap setup {} }
    global strip which nFrames delayInterval oldurl zmap_url_url width map \
    crl_map zmap rgb target
    set which 0
    image create photo strip -data $strip
    image create photo clr_map -data $map
    label zwin.l -border 0; pack zwin.l
    pack .zwin -anchor w -expand 0 -fill none
    set nFrames [expr [image width strip] / $width]
    for {set i 0} {$i < $nFrames} {incr i} {
        image create photo p$i
        p$i copy strip -from [expr $i * $width] 0 (expr ($i +1) *$width] 50
    }
    set which 0
3 set up binding for imagemap query as a result of user's mouse click
            bind zwin.1 cButton-1> {
                set zmapx_x [expr ($which * $width) + %x]
                set zmap_rgb [clr_map get $zmap_x %y]
                set rgb_list [split $zmap_rgb]
                ::browser::displayURL [querytcl [lindex $rgb list 0]\
                    [lindex $rgb_list 1] [lindex $rgb list 2]] $target
            }
            bind zwin.l <Button-3> }
                :browser::displayURL http://www.eolas.com/metamap $target
                }
}
################
proc zmap_playnext {} }
    global nFrames which delayInterval
        if {$delayInterval != 4000) {
            incr which
            if {$which >= $nFrames} {set which 0}
            .zwin.1 configure -image p$which
        }
        after $delayInterval zmap_playnext
}
################
proc querytcl {R G B} {
global header ztable
set id [array startsearch ztable]
if {[string length $R] == 2} {
    set R O$R
    } elseif {[string length $R] == 1}
    set R 00$R
    }
If {[string length $G] == 2} {
    set G O$G
```

-continued

```
        } elseif { [string length $G] == 1} {
            set G 00$G
            }
if {[string length $B] == 2} {
        set B 0$B
        } elseif { [string length $B1 == 1} {
        set B 00$b
        }
set searchfor $R$G$B
        while {[array anymore ztable $id] != 0} {
            set colors [array nextelement ztable $id]
            if {$colors == $searchfor} {
                set record [array get ztable $colors]
                set record [lindex $record 1]
                set flag [lindex $record 2]
                set script [lindex $record 3]
                switch [string trim $flag] {
                    html { return "$header(html)$script" }
                        url {return "$script" }
                        default { return "$header(html)Incorrect flag in \ database"}
                    }
                array donesearch ztable $id
            break
            }
        }
}
###################
proc assign_strip_url {token} {
global url_data state strip go
    upvar #0 $token state
    set url_data $state(body)
    set strip $url-data
if {$go < 3} {
    incr go
    } else {
    zmap_setup
    zmap playnext
    }
}
proc assign_map_url {token} {
global url_data state map go
    upvar #0 $token state
        set url_data $state(body)
        set map $url_data
if {$go < 3} {
        incr go
        } else {
        zmap setup
        zmap_playnext
        }
}
proc assign_table_url {token} {
global url_data state table go ztable
    upvar #0 $token state
        set url_data $state(body)
        set table $url data
        array set ztable $table
if {$go < 3} {
        incr go
} else {
        zmap_setup
        zmap_playnext
        }
}
# end proc definitions
###################
# begin code main body
########
global ztable width delayInterval header map clr_map zmap_rgb url_data strip \
state table go target
set width $embed_args(frame_width)
set map_image $embed_args(map_image)
set anim_image $embed_args(anim-image)
set dfile $embed args(dfile)
set target $embed args(target)
set rate $embed-args(rate)
set delayInterval $rate
set header(htm-1) "Content-type: text/html\n\n"
set header(url) "Location: "
```

-continued

```
# Fetch the image, map and object-table data
        :http::geturl $anim_image    -command assign - strip_url
        :http::geturl $map_image     -command assign_map_url
        ::http::geturl $dfile        -command assign_table_url
set Name.zwin
frame $Name -background LightGray -border 0 -relief flat
scale zwin.scale -from 1 -to 4000 -orient horizontal -width 8 -sliderlength 8 \
-tickinterval 0 -length $width -variable delayInterval -showvalue 0 -borderwidth 0
\
        -troughcolor black -border 0
pack.zwin.scale -side bottom
set go 1

end of applet source code
################
```

An exemplary object index, image and secondary image map are illustrated below.

Object information table for the above zMap client-side applet demo:
(filename: world.mtb)
189129190 {south_america too {{}} uri south_america.htm} 251000251
{carribean_islands {{}} url caribbean.htm} 185255185 {ireland {{}} url
ireland.htm) 255196255 {australia {{}} url australia.htm} 078173214 {cook_island
{{}} url pacific_rim.htm} 155155155 {south_america {{}} url south america.html
255255081 {indian_ocean {{}} url indian_ocean.htm} 000189000 {africa {{}} url
africa.htm} 102102255 {japan {{}} url japan.htm} 000128000 {hawaii {{}} url
hawaii.htm} 255198140 (europe {{}} url europe.htm} 255183219 (bermuda {{}} url
bermuda.htm} 189185219 {iceland {{}} url iceland.htm} 255000000 {atlantic_ocean
{{}} url atlantic.htm} 255196225 {australia {{}} url australia.htm} 255185220
{asia {{}} url asia.htm} 128000128 (indonesia {{}} url indonesia.htm} 255128000
{pacific ocean {{}} url pacific rim.htm} 230204255 {new_guinea {{}} url
newguinea.htm} 255077166 {arctic_ocean {{}} url arctic.htm} 189189255
{mediterranean_sea {{}} url mediterranean.htm} 064128128 {north_america {{}} url
north_america.htm} 000255255 {bering sea {{}} url pacific_rim.htm} 255255000
{new_zealand {{}} url newzealand.htm} 64129128 {north_america {{}} url
north_america.htm} 064149200 {greenland {{}} url greenland.htm} 255255255 {space
{{}} url space.htm} 000185000 {madagascar {{}} url africa.htm} 148148148
{indonesian_islands {{}} url indonesian_isles.htm}
Animation image strip for the zMap applet demo {Base6 4-encoded aIr image):
(filename: world.man)
RO1CODdh3AUyAKUAAAAAAAAAbQAAmAAA7gAAhAAAxgAAsgAAigAAtQAASwAAoQAAzAAA9wDV
AAAA+gDXAAAA5gAAfAflNAADHAADBAAAA/QC5AACvAAUAACZAACLAAAAwQAFIgAA7AB7AAAA
rQAA2ABTAAA1AAAA8gAAiAAA3gAAtgAAkQAAEwAAVWAA1gAA1wD8AAD2AAAAbwDoAADgAAAA
yAAA8wAAYQAA4gAAeAAAowBoAAAApgAAPAAAOQAA/AAAUwAA6AAAAAAAACwAAAAA3AUyAAAG
/kCAcEgsClHIJMrIbDqfRCVOSnOmq9isEKntaq/eBHbIFZu3l+WSKy2vvWrlGx6fO8H2Lz5f
Vbr5UH5ygIF+hFSchlOJilaGjU5lg5BHS3+UlZOYRZebnGOeTXuhAFKkUaanjKqPrKmhgpqN
KCIcOTkJubkivcKQSBy2uLohvMGydkvBt7oJrTkcvrMowSLDuSEStSLIcBDCzQm3wb/U4M3j
OorfzojQHL8AvSLh4/CU8/XvSb3XuemUgFmjS4 4cpWoEddnr5q2aP3H7Dp5TCE3dIXYPAUps
RzFawGUZK2ICWa9XOZLueH2c+EIkL5QdLV6E2bLWSJYQDUimZMD/sM5PK3pbMTTHiZeHFse
w4dz4ca11ve7Nolms108zvBLwmME1gFevM26E4CF0ah5rWrnO+AqWK49sMueg3dqVrVqyKgHN
Vcs2ANcQgLUR2lv3690EefNQw0V3rV23iO0uWaw1ROG2M/BKXmMr7WW/kBMn69y472HRdngB
5vs4clIAtEQAtuzYcGizdmzNvlEbs2bYnQHzNu22KqFonnuDdo0aKC7hyu8aB4TS7fDWgJuf
UV0a+3Q+hK0H3nwmPPHM350Zb/2bD+XutpmTx8qYtWHeZAXrrf/59Hwx68WXH25y0Q0fb+L8
FOaAXtOglocDGWhfg2IFRuB2En7m4Gw2/uk124EBbJjdhWtWN2GIDyYInmw3hOhCDTBGICOM
NbgAVjYkeqGagwG8GOOMMNrIG46picBDiz3SKGMENAopVocYbuWVjzUs2eSN2sHBi5RJ/sbk
krgqiMwwjlrpJzghpmfGYlyaCWSNDaopBptlKvmmjX7xAOUZtOTASQl2fgmnX3AlSGeZHnh5
JaF7rrnjlIEu+msoX0QTgox3uckonpomlsolmEbqgQctbpglG9rshemoVd6JqzwAarmWg6ye
WeOrp3axJZ13jOqBrU7CuucndY4KbJy5aqHarLOmCmypwrKx65S+/spkonjoEK2usqll46+/
fpvttlkIZBmJc/j+y0qi2yWKx2Lldtqruu032QSa6rUbAarZ6Uqpst/HKWC2SmekXZZ3p1jAq
jwX7m8WyI-C7pK6Y38ABNkZdGLPDCr15cILyaKuzBuB5jmHHAQI4MlsUOj8mix1+SiiKRJbLY
bAQEEEACCQf0vDMBrrgoJ5iPrHjzTnv3PMBPxNw7YYlh2Eprb7qzLPPJ0T89JNFO3F0tRoo
jbXWCpvadR0PuvBr0lcznbXTZXO95tRJ4qyzBks3vTW5U6RdpQdW4+022ULSHAabDr5ot9J4
6x03y3MWjfbPYf99taQz6nbWopTPrbTHBs0hy1Sdm513iRoAHTcxbT8RKphmS62/tsaflCyW
wcMe2WuVng9ue+vlSV5t4J9PLLcZurWo9qiWH9B46nCTenysqr7IfNiV/wyu9HxD8aizHmgg
/tJhE262oy93Lv74g8Mt9PRa2qy2vgSs/zzhadYbydRIh22/49zTnyi0Nj/A2U98l7sV/FA1
v78F7oDuy9/ZjkC62PGufgcUX7hspC3cSctIyrtg6jK4rzxF7YMZkx3P7AcOX4Uoc7EclQqz
pzrQkapgEzQCAUXYtp2pjknvg+GCbOas3ultVIQ6IbdAVcTT+Ux8qxOSEHVERB6ijmw3nKKy
Mg856lgBQIIYxi/eALnTSwzORwCEa9agi+KcYwrKCMJ/sBlKgBxMXzic+MbyWjGOKVRCGvE
owYyAEYBZACOZaydH+1INQwOspBi5OMcF7mgO+JtkBk4ZCTjyDS4DSOHANKdwnTmxUzukZOK
rIE3D/epFo3qbmOEYyYP+cXlubBgrJSSr3h2AkKGcZaZPIEGF4ZLOEiod7zU4y8zaUuOWsyX
aOHmAWJpSDEyc5jSe6YxpSRNau4xA83MJijD4KcWdVOZcAxnHRekql1OE52GXIE6nyQGYgVA
ZOLz5iYTabxihHItalufLO8px37+UR7nEtkKZOlQphmUkb3CGd56yVBEQpGSOrKkBmlJTAHw -continued

```
sXb6WicbWtksD6zQjcCUpAvp/rnNRkc5UjymVI+hE+gWS7nKjAlOmODvJJJqWq5wlPaksrQnO
8jEpT39EgfBGlcxCmrKWUNQXUg8HwojW75lDRaQZjlpML9gUcEl9oOd3mjUkdlVXdwzrKW3Z
O7NukWomxeobCZmBRLZwlZWE6OshOcaigrQG+BmnjjSqz3T2OQOMyquvxDdLDNgAR5CFLAYw
METssvSti8VkBiYbWQzgwAaUVebE/InWkjI2k5P1bGRtoIDKKpJUpMXs9RqbWs6YVgEetWxs
H3apzNK2tqmdZR1HZSNtyhaPvwVuaHcKugAY17em1axygyvaCBRXsFn4VAB8KwAFTHeyrgXa
dUd6/iRw5bG73p2ua3813pyroEf6OqOCVIsDz9Z2vSOrGHb74Cf4EmCaS1TAYyVL3aX68Ln8
fa8LcPbO7jo2spAFLX5hu98q9HfB9Wsjege82uXqNoOXZrCG58vhCLdWtAvb7ZgutWA8gpHE
EP7sfFEM2xzSorwM1qyAy4yBGRs4xWmUDXw98E7Uqna1J/5xjQcbUSIPOsGpRfKEL+suFmV2
BRmYL3B1jFS1U5m/vZltlh9c29t6VJgt/DIi+uvbMR+5trj1JHHVvAg2M6+XUOZsfcGb2wPM
VMVrLq+YNwvaKLM2k3H8YXFtfoFBp5fAPe5yGZ22aPL6V74C5qx9KZtb/kU7tBJUOO4rcZrJ
He+5vvMl5KSt+2kdKfh6snxwZ3tMSzSzGsFVsLKYYQxhOJ4Yb3fFNRVOjdxSlljG4Q2pnrwa
5mJnmcOePTSKbQToKXDxtJO9gLalbQADbPsC4P3xhzRwbUXm+9vbNsAHwB3aYY47C+U2MrrR
/YFwulss5KYatjEwb3Qju3yqxDe89Wlufvd725PF7QnmqMoZJCDfzdr3wRHO6YUToOEPH3jE
Cz5xbfMZ4H7JOBivVkMrHvi4UYzxstlmV5hUN4dt3dZQ16uBDhIYaT2bMfZfc2L09xdCyjm
3TIJ2nV7u9/2VuTP+xDOe+rsBNOF7c6TzjGR/1eh6TV4etRxcPJOf5vq3GO5OEkA9Qw89gMf
OLrXeS5ugY/851rPNNq7rXaKo3hI5A4LUy169rTTVe71vbvbqwAqnEM9vRfw+9+PDnYHWZOK
TLybIR+b7sWj3bGcDwHL9Xl4nXf972j/7CHvrXmgExylXL9Atysf+kNE9N1MB2j4KDrZuate
7ZdnrQAsDtjBLwLrxT737YefeBnvPmu9L33st/vykqN79eOGt+55v6GrkAH4+/48t739gcAf
3+faqvnYOX7w3Csc+UtHBNbjLVX+d98Gh+R9+qnQdAMeXuoxdz36HZ7ve5qO4GiHchWnSLzx
eNZ2es6neu4ncxfn/ngQJ2btV3cex2mkN3DbhW3bZgEaqIEpOIEbiHCiBXsH2CsYqGObqIEU
YAEdaAIWoGOfAH8GJoJQwEQ1eAEnaAEpqIEmYAJHX1px5DQy+AQOaG4ZeII5UIHq9oIK8IMR
QChvR4JEaIJGeIMu6IMn4DTzJ4SOUoM3eIQauG1WiIX8R3hbGIU2OIUnCIZLeIVNOIaQV4aO
VYQb6IUt6HFL+ENZKApDGIdSOIdU6HGExIZ5yAQoEHQ3EAF55FlyiIJ/CG7BJIYGKAr113OL
iION2G61M4hHOHQ4OOYCxm1deIkh6HuRwIkE4Ik2MHccuIppCIgxSIpOYIqoOHc7yIFO/giC
r6h8gQAqnbgCAkaLJtCBKXYCLrqhBafKEs+eLJpd2LCiMHoiExVg7QegEvMhYv6h605gCKuiM
FmACieeIuYiMpJaKaceBHZiCK+iNiQeDGjSNhDiEvmgDiWcAtbiN2pgCOxh9PSZPOngDkUiI
NgeFRKeK24iDwpiPaAd/iRZ26gdQJUiPLGiPKoiQLxiI/aiLVmCKZtiNKmiQHsiDCbmGGhAB
7riJa9GJfHiGG6iNE6mOSviDiAWLAHmS9aOM1UgBwtiNSRiGbfiPJhkAVbhZN8mBFMmTmSgJ
smiTfciIGwiSFSCQguiGUIB/pXiPJXeKTZ14FW1gR1kEvFiT/r/IjBFpia341CIpPT5pBJGH
ituWjdp4i+uGiSTpj +K4kfZIjODYYjjKp1nCYbQjQjBQwAQUQA4RZABOAk/iIAPVGWXqJkU1Q
jYNObihIYY5ARMQAwVQABuQg4qJA6O1TAw5g31pcJNpmZdpmZq5gghwAZ55fHPpmJs4m1JI
AYFpmoJZAIhpAp15ftYVfoEQkMg1mThYm7Z5mKrZfbzpA1IZi7J5hRZnJZJm91YfMm5nO/Y
nKUJndKpm/VWnWm5BXtYe85JnLYpnS2InHVFAr35nUIQnqQ5nNB5mDloh66pnOxZiHq3UQIg
nM+pnfPJc2Gznr83Awum96lbtlZ/pzmOYYEGZp8DumBk111chwAqSAEbEJ8LCqD9eJ9BB6GH
N6EoeKH++Xg11p6yaGZEgERqgATGozDKJinGZ3/CV6N+YYeKqEf8JcduAGVGaMZSqMX+YZQ
iKM6mgI8OpgxgJo4SaJAGppCmJ+DxKI56qJHSpiYKZ/ayKA10oKz53w6aqGZaaWZuQHaqJsa
6qR6SCupk2U4oG1UKphimpqJWaIx6JsZCaWb1aIqWKWXOabH6Znh+JsEioiRaXAuSp1IImqRy
yp3lJQBbeqcQWqhSaKSZeZmYuai76ajSaKeIOKgRyp+BiaS3SaaJiZzlSZeCeqNSOp6mWZjG
WaqtuXC9/gmbSOmpH5qjpdmjgkmmJBqr6umgqaqit3oBwdifCqqaPCerwAqpwkqkLGihGMqZ
3ceYtbOsWhipzjqM5GmaPOpZoGmt1KimnTe1O6qrMsqk1IqWQopHRLqNfKqkM5quykmrRCAC
WxiH9EipE7AAC6AD/uqv/Lqr+Jh47SY9/2GvJMiHOMijMvCv/wqwC4CZZAqSNnB8Bus99yqU
NtifDvuw/Cqx+KhuFSurDjIftJCxpNmfErCyDysBEZuaFOuafnGwrhSF8DkBK5uzEqADATsB
EyuyMjsDoFavKGucKquzOfuymxmzsuoXQ6tGDqmwR4uOK2uzP/uCQfuOpZAD/kW7sbVJtTkr
oOyrnk6LsQmrsTcLtlUrn3WIAVlrBTmQnlL7tWp7rq5ItkILtydJAviatnXLtsWIWHkbCXEL
1J9ajkZqmS6bsozoQtoCblzektUqltlAnj8SauA37t9IZuA4iuYXbrKmYr5SSzuf6KtHYLuSVr
tizVVcxlqQ27ADsbu2u7uah7Awebn6ybrwzbsY27sgtwugWbukZTs6jVurvbrx77u7iZgpxr
u6obhcF4vA/Lsy+Lk+rYbnNpsggbPsXrtYPJuxALstfLTDdksnF7tob6ovuKvP/6sTBLsOQ7
s3oLlDYLpjHAuO2rtCELbobUj+ZLuWj7nK+rs9QrV/r5AC5oh8r+GW71GS7f/qrMGjLVNO7ii
8LkRGromMLU7C7ASEJOhK8F4qBCga7yKS7XuS7sji7eeS7kCgMGuq7Yd7LNZCo4qPL8jrLvf
269Ua7f11p5ttuMIL3MLGmBMtO7vMC7111O7y9csRY6LoOu8HUC7yZpJ6t8obXygLL1aL/g67JK
e8TBewNaa2VEqIEBCrv+qgJonMYqALGp2ZnkS2eAlYtjjIPr668PoMZozMZk2pm7J43VFsfo
65w4u8FpfMd5TLIt3H2uCccIFcgVOsgS8ACGXMh6nAJ83JTcBsjcK5QoCMm/M1p3LsLkMg4
ILOZTAtyHIednLOf3MoP/1DJ1Oy2pyxkm8xvq7yyrtzKOUvKpvyOrWRSqkzHrJzLkhy2KRjL
TTjL5TXHgTnMxGzMX1jKmDyOSpXKnCzEzMvSsBuPmF2NtqhNhfKhrMzZzNz1y1S5qXJHnK
4hyhbXrLkUzMDwNLRi87PxezQqqPOqyOiDP84zO3vzGyxbO+OzOOUqp/GzIuUzPqJsNTtDO
UDehlNqxePzJDB28f9zIwpoBE13GyFvRa3zRb5zRYpxJHVOAFF3Ihwy7hxnQ4LRkhFjS1OyZ
KV3RUTyf2AvHqOzIwvzReLzGfu7G+DSVDzQR1BOtSzIrPzUTQM2v3byaGLOZSoXPY/yiiwvK
/moMyzOMTiT5xlMdxLaMzTuLxq3clKO8x4q8cKRyzOHMdfCMlbrslGgtzUVNzRAtAB3tya5M
lsZsyWlNtl59lycNu/H8zCydg3+dzHZdOBF9OB5tz+fcwUPdgnSt2A/N2Hjt2CjtOwvtsild
zlNs2QR9iAaNABPtO4VczABN2cwk2kwgZPms2RQ9yYe82uqsXl5jzRJNO6itAoYMsT7rOn48
tCAUnDZopA2rAyoAAiBQAs793CXA3GscsRPbw+1Iq2IcmUqt3MwNn3c8t3TwbA9UtzX6MNnKs
3bcsyc3t3DDw3SAw3eKNj2ntc9h93jM9yJ8MA/oN3e8bN3f3ItzT7H/gNos8zojYP39W9jGneDt
3d/xbQLzrUoCzgQccCCkIgFNhXc7qreAJLsnwPd67F+BNMOGAYuFKjeDtreAW7d8ODuAQPuAu
10sXjt+SrOH6bdEdbLOP71wDfoEFjuEzTuM2/tmsWWCgLuFHknXobdUmruFBjtNE3uJGfk+M
FePmTOMwOOQBrTpQbgQc8F5ZF9E1nt9ArtpCTq1bXgRd7nSNHbOy/gBWjuWg3Y4RzuVefoqZ
HbOH7ttuPub//NnWXd5R/uV3jtz9+gAg8AAlwOe2na4yKWSCznV43q/LDQInnugITuZOft3m
LZBuTejcvd6JHupwzr+a/tpyDOPHvQHJ/j3p3p3oh64Ci66pgEWrIm7c6d3drd7fZV5XgE7n
AknlCJ7r7x3ekO3qvY7mxJ7lJa7nCu7eHf7fTl4xIV7nUAfsn2ZpCs7gHi4+gDXnyK7mg+7j
e37i1/7KKj7fsDXt4A7piVv12N7eNh4DOM7iAUDrlD7oqi7pP87kZO7hV3jmRJDmj/4Bkf7p
7l7jhx7r/67jgW7n7J7Vs/eGl7Mv5vO3lrkdL7uBO/prN7o71KWs7wpOTsa87xuo7dOr3o
XOnt9WrfD7/qJ8/fwO7dWX7sRMs8nJwC+2rwNNDzPu/zOT3zBSDfjiLkwoGavOG/L5czqP9/O
QT/dQ+/g17sw//pKB9Nyr9G1eAk3/80/Psl EvwQSgnFUfcZws5hru9P399SMb9bh881e/sW2u
4S+g3z3f9aMs32uvnEefKW+PzWKe4HOf4Hav9h+u9Oww9tQ+8yznx/g9/uu34E/8VCP94Xf9kMQ
t2qjAYqfwXGv4I9f7itL+Fdo+DrkcoOUiow/7o7P732egvU2+RU2uS5g57as81XO+aoPOE/p
+kdNoOHTwnBf+4B/+zce5OBD+VtLoKdY9psf/CiO6cQv+lFg+XaeisG4/Knf/KfS5Oa/+7HP
usGIOsrd+DDQ+SWA5Y5IgHEB+90/8eDP9Mw/8fP8U11a9KRs9cjv/SnQ/t3d8zbA/gOdf+VA
8HhlJBOK5YL7aDyemwgO1QJEt6ZGYPuYUoWFTgUC1Wh1Mw2WFg41hWNSwHRCp9HqVYC5WChe
SXjsTLBkcjcI4sTmqempDgDlzkMjQ8+EYoIkEzQrESMzcgkaXHOESVn5opyr49IKJCzzBNE
RWfBDVHxhMClse50xoVgUoBPU2ItTfnlbLb2NkUUQ2DXZSbHFFX4JIv1+AHkQTntJU1W7Lkg
```

-continued

OjGOwGOGbgp4O2sr5VtoHKbcHCY8fZONarx8ydNGgJsWL15OJBvHT5kQgCbYVYOXLRjCegu/
ANIHUYOQQwEHWsP262BCeww11SGnT6KhIxV5XcNIT2GX/o5iNpOZV6jIm2kWTxrMqJIjGJ6x
OMAAemiUhppFp+S4gXP1T1ixZoESSsqmoyouPCDVqXQrJ2e2cEV1RNVOCCsaVmD4gEDnH1gQ
evTl2wPCOYAI3N7gIVaupFUWLBwLs4nv376BaXga/EHBChJOQiCeu7ixK3EwaESWTNky2xQI
MGuOEOBwHRGJieOJjWzOvheSAQtWzTozidexp8z+XOx2PnIvmDOfTfDo1NOCuYXtWjBzfsubb
mVWm9bu180qyecytazv7cu7M1YUDH3y4WB4BItRGOHgB7hLq1OccsmCC1cKLT7YQ6KNLj/sm
yE853daDSKQiVrsAvvGm4CAX/hLOsyAvIfZzsL+QDGGMQuqIk4KD+epbQYEPOHQMBOOe9G9E
JDLTgMALVdSwmA5ze5A9EYsgUQkcLURxRxbvsqAAOWQMOS1QiFzEMEdSpE/DFvFi6UcgOyBE
SiSK5MzKJLU867EygITwAR2GFJPKzuq4MoIs7OJzrx5mTMM9CQkb8wY5i8tQyS13gkyy5miU
LokVmAjUOvvwRJS3wEJyc4IpHxUUrdpAw2e/OnjrzTsViCiARAWoPDGKK6+zrUnczIFgt9N8
A9CC6cTjtFUVa2MsPd36qpXU6NSxOdHXeAWAzizRc1LN7fxC7TvpbMMtgMOjnNPPOYJ1bDw1j
BYRP/1sdsSwUzS6bG5bN96hbt11OWQoERO6aEsnaC11111tD1UJOT6eeyVTXHJE898x5KfVL
USFRRVa8feNN+NAyTPsLAhrfHCVi+ayw0980Ra30nDDdOjIuh09U20JRqR1YUzJ1s6IsBTAw
IIUNKo6sgw4G+LnnyUq1ZYMUDMCB1BvgioQYA/jYiTSefQa6A6GjK/poBXapoaBHmF6MAidh
aLWHnn8eIOjerjYaBSOJqcEsKb4uJmxZQZwa7arVrbbrtreO2w6af6lbteOaODXVq/11fl2224
lxYcbLENP/zwDnZjZu2s/37sCptZkbw5yg/fDgZcnum7ccCpuKGGYVZJ/oHwOSannHSBiWZ8
851bPyHyhh7Yb/bRG44Q9dy1gITmExTAwemwfQd+WNEbqD1CC1K4wO+3AQemc+Yt2CCTMYR9
oYEBaB+eDaGO9sBxo3a3GWed/xiNVubKN78By4OsHk4m2j8eFe/zXt3CwB+fUU5/GYsSEb4i
B6W5DyHLi98XCnc5yp1Pf8xYoAQayIh4PCKAEWReznamJ/KJzjmWEoKbO1gKAM5AgBP818h6
JroM1u47HLzemFwoBat4QIQyTJPUzpZBDfLPLT3OGuRuRsIZEpFqz/HEf6yXxAcCkImfe2Jf
zBbF3kTpdppzR9e49yo+SMB3pKlVfxO3NlPp/tAAGFifEoHRusG5QnzbwVvaArM2K36wjiL8
HDJiND7p6a2Pi8uaAwEZQuWNEHx2mxz+mpPIO+FujI2EYRCdqALZhQ6BVWNP5rLHNU3GsJOB
qN8Jz8cc1xwAcXTHflUC+UghqpKLOqtdOIggy/9FoZYSTCUZoGg+6qUPCaXcniOFqbMt1m2P
euMHEosOyzowE5I1hGYREVkZai7i14F7XxOdOUQuR1Nxz2gh4IwjiTxsYQMTmCEXzzYCexax
LOOLwQYooohHnaidg4vBPMtWz3sCLZ+p2Wc/BXCACJSLCp6imzw9RIO+3G8A9hwBPnugT36y
w6FHwtBxvCHJFOzt/nAHRVtCv7NQkBosoGDDRAVFp9H76c2jDA3piTAUADNewqTSu+BKO6rQ
jwpkp4MiqTGCK1QUFrW1R20oTBNzgMXEs61OFR6fajEBqSZVbnKpTz2Y6sn1aPV8IvKqTqk6
14OANR8WZaVW9zeUFwAqQZzVW1MsIGBx1VP5UNrXYMipqmKVEUHeGdfB1pAGNATfyPQ5TTt
2kHEOkexCrnEvx57wp/ZE3HGpGxhC8PTxG7Er218bNkEm9KzTe+Ile2fzHqFWdQ2NhD2ul8D
JIvA3byyqx2EKJOyCO/ckoGeNTUf21y5QKgAilMpukEEistYguINtIgTpRpM9dw4XchA/tcx
7nUNulFKYu47aO3EEh7KU4l6g7yfVaneuKsDlwpkU+aqjOxlZdGCyte8RClVETaABKQ6wbSY
5S9Ny8vRnBYmuqfVAlNpWtMA49So/fzuwaiL2p1+8oLSE3CGXzpcCY/XsboVsWB/S+K8BiDC
t1VIatNOUbTC1qv2/apeT2zdGv+XrqO972ET3OEZH9e/2M3uVpO7kxcXuboODgRkMzpfwnoX
rHbosZSR+98qXzihIvGukQAqViwcOb5fdrBCLUsc5HXuAxe4xAJqPLURyADPeZaBeatWqnw5
sChfu8AF7kHnGFnUznroOM5+hqoJ8VcMXblbMoOF6aNZmVNF4/maOn9UBHKL4EHKU/jBp/nvn
Fih6O5Z59FSAKWg5jlo31GvBqfFB6lTTYtUmkdtVJv3qrM4a2LbGYKNzHTcRpKLXcAXx4YIN
bOOSu9OY+XTggDgJUf+62S1AYA9waKpouO3XlJZEi3wNjrMyO9tpFVgbKOBpVi8RzoZSTmDR
3Wxli3lcOz5FqA1111jzNtvaZrKYKTBocIdlHgjJwLUfO1lZz1oGzh54ZQe9iHAnXHkrMzRy
OyDYgPf2ygW/AFhOgnGK+bvUEbf36Ljd5IoDGpgpOfmUT2jqWs86rWAKyss96MOjzJzjnwV2
rfeMwdEagedOKLnMNV7nz+oZ2BvN/l9H/eFoNyQ9OscWhgaAjuinZ7q3fVZltJO2dGRb+9Ub
9zqmwQ4OfvAyQIRZwhjNThaOKzvobEclQv2M9JEzMuZHWXi5Qax3Pd/a6tf7e89B+PO7KPvc
DYD44fk+9nEBvvHbSBi2g130lXI635kMvOabnkdWBnzboHd3L+hg8tJz/OErx7HlV3+RzEfw
9Ws3tewJ+219M73fU0401AWO4ybXvu64D37e79x24x084r93/PJ1n2nPix36I9/FOwJ9FeXr
xOmGX3T1cX31xV+cNiuY8ReE/3QGvB/+DLg+VInWTOdxTVAJWKr8xFH9+MN//ryj/hJBM2og
ABIAmN7r/owkQHwKirdk4P/eLwA9YQBtoAAPEJjO76dcgRwO6M4YoAX+bwJBoAIvEAGjILzu
cBnobffgLwPMsARJwABPEADkogZUcNkkb9bebwf3rHzEjgRjyf5kEANROKcQZJByMODkT7KY
SwCFkACJkAYzJHJW8N9OEPUqh9soEAotUAqlQAEJJ/ICDue2iguPygTBkKT6ioLGkAzvjYGG
cAYTcP/YjwxUADAKz8PkYSEzS8BESIABusHeEL/ZCEATLcA85aLaKEAUAsQYORLM4BLESLeB8
MBEt6wQbMjRAhEZ7sUK6EjgcPERH3hw8LIxMdkRPZUAcI8OFdEADhUBFPRk40/vER1a8TV5H5
VO7/WiDVkMkUpQAVbVEV2w/T4q8Hb80WhOl+YCwBNzED1g8X/S8CZQBxRokEYxFQTvFj1G8P
nIkYP3AaN80pSrFI8C8DAxEHSS3RIpAJyY8cqeQUN5EbF7DwwFEEkTGWZktbaDEVxfAKd/Ae
ya8CN4wfhGZ1DDb2vHzznAIZaYgoTG3Tu8NBbILL3AWgxEi8w4L080MgxANv/AP5TEjpZEj
ny8G5zAka3IkUy4CR3Ga4jAKUfIhb/EbITAcRUsN+HC9QHImhzEx2TEAxzEWvVAm9U8lafIn
b3IhPbJ/ULKdFGuEvCAMRPVnbJIBHAArsRIAf6Y3/sqPbaZKWObqVcAPBKhyAKwyK7VSArky
MLzyaIgsLpZqpsqSL8oHLdNyKwegKxPvLcFKusxo1HajKg8xLROgL/cSGvqSQGbjCBcjME/I
EEEQKwFS/tiSBtwSB+AyoqzAqorhMesN2CbzEGXAMjFTMwMqD/bgMzctUSyzARBTHRRzPJ7s
MWVFt8jQ3vSyLfkyM8EqpjzTNiETNyWOPR6ANO9TARckH25zOMuwOO3qK/OyOQmpNISzObdK
zAzLL+cDMKmTL36mOZ2zHLIzKgiEuATAewKzB64SECeTI59zSE4mNs4zKulMHG4T/gpTFLHT
rvRxPk+rPqfyO1kTL18Q/ifJcOyYkV9sKODpcj3PkgcdINgOMzDwbRQOAMGObLqgEmekOkEH
8/OKM9jYsuriMOHnOOA6rEHN8i6zOgWxs7v8s1c4EzO71NBYND/xciOHAD4zRRZra7/O4B6B
80FbVCOrUzcvsz8hDEihUjWD83CMlDB3FDb1UU7os0OhdCP1kOp3MzGRJr8WVEVt1KyYM9um
FE1hMzp1BkvJU1RAkwxJMO1NM6SuFEDJ9EPPMjxHxOtjszfN8O7d9DshNETfEMeM80s1s009
FEdDTEDFM0puwQJk8z8ZFE8b9Sp11DV7NDoXM1AZdVC11EFV1EqV9VNvNFRz1EW79DITD3vY
/ms2HY8LBqr9RsBRdwBXcVUtNwoI7WsdDq5VPOUCZjUaC8pWMzVXdXVKeZX+YuBXLSIu7G7h
KOwOfeZysTJZd2BX19JXKQJYmWUGPqOkZKd84tUBsnVbe9VZvRVawVVax5UcHg5bkzVdm/VZ
ayJYrUB54HUfYo8E/jVXWWBZuXVdpQ1fN3PcXASu4rXe/tTh/3Vg1fVerSEuy2Jah5RcG/Zh
/1XiJJZdDzamSqqQJLIFNpZjR5FPutVgKRZHRY3CGBYLTZYFJG56cjJAPpZlxdJ1F7ZfNXZj
afY1oSID2pUDgmHSpYGTiqjD1FmgdZm32Ducvbn+JV8MioEsfVfn/1F2HIWWCaSW9LhAnkZW
1pCXp12a6E2TIv2a1OAVmEvZ1mAXpd1dEpHts5vBoJ1bdvW6461ZE12SisnaClAFNzmBu6W
CmSVbYvVWm8VVx2WZ1tuCGIAbTOgZONgZLAHvTWWBk3V92Tdp7WRh7FcItWXluEWGuVc5Xl
/aQucJHA4q4OI6yNWH9nb1NXWy02qOp2w9QW9162X5eWbDsXdwVQc103bRE3BqyQZM81bleX
YNdh5F3FWEW2B5WdRmAWYn3WdlUelmxek3WELOXAgsW3GA3bxUXePs2awXOY1d2dLs36Mw1
TE+2+DSIBMmXaOG3doNXWbX2fif2fc8X/nX593ad9zVt91e7NoBx73Tj13brlTtI6lt5N+Ma
eH/nVXid12MpJL8gYZOUZBip8gPntQJKWHWLrisHMDOOB4SsgABA2BtFGJJ2IQLGIXbUoVX
gIU9WBDphkiLkYYr4IQ3KoWhcIXhpoU1gUU+ZznJZ4SZt4SF2IaJGIeNWIeRGABCKHKauN6g
uIa18oYvM4dZOItdeInPiIvf91+/2DDD2CO99YoN9w74CnzS+Hv9to2pWivtmIzn+Kg09I7B
F+fmdIyx2I992NzMVGbpd6veuDV2+JC16D5fwHwCeX35UwI+6ojvdt82OI5nbZFnF1JFYiY2
ufF6mIkn2WcF/1ng4PMr3IGTQ+iMw+aT1ZeVMXkmytFwZd1OdaaW4dZK8BxZO2yXLkP3+YG
TvmFe5n931SNHXYHGBnHHFmX1RmGm/k7RziUiXM8hOAZkdlrUmGZaVKGyVaYH5abF6jAogKJ -continued O3mcQzibZ9iLpVhCR9mb+5AJYjkV6IKZV7Gcg3iID/We3UKfW4cSbvEB/nmehlg3FOi4rLlF
zsif6/KJcTWKGbqIHzqQYDg4zUf1FnqKCRkKAQWiyZ1WVpkF6DmPRVqTddgJShqe1/OZN3a1
i7ild5iXTXo9K7ppmfAlq/im2zmnYxqIvRidB7k32oSPhfqD+/1DK3oHLrqAW5kZ/hzZ1LO4
qXW6qC2ajdvBTJGJIK6oN85huPZnLVajd1knW9EqFmHrLF5p+WZq1W6HW3aW6kknG9Q/cgO
6GzyXKMYsLV1LcWOL4nyGjoZEvna6/w6qgHbhKeUNAk7MQO7B+roVzBBBfO6RBvbsQW7MiU7
NikbsedxppaDUP/asYUYsheysAvQJgKIBGoTxEKTswN7tUHbaCgbq1XySWcb1B/Wtge7qFpb
Bm3ikLPUt23Zb4W7Moi7feZ4QzAbeMjHklmZtSfbtbEhkjGWlKj7t7cZ5ObJuQB7kkNDBUy7
ui+ZFEM7u9/sspW34OIz1EVZ2OgxUwxAEYq7slGhO32b/gE29pyHub6Dtg91UGnqiEd6+6zu
OMAB1r738L796R2gALb3uguU17uV27otp71xpVHOe7cTG/yQK8PnW5SpOb5zewngRgQQ3dK1
UrP/e76drbmWFAMK8MADiC5sQLELirGj+JZTnGMcx8WbCMYXe7MdO6UZ2b7hZDMOW8frwmmO
3MeTPLU9e8BtVh/3G4Zi28jpTB1Pu7Yv+rYh1OSppMUmMfNG/Z+/MrLvLnP/FHSvMtfHL7F
PLVVm7lLgC8Bhc5VssczHLWFmcz3nLjnwMV5fMSR3JY7GB75HLuL+89FnMp9hrFllrOpEbfX
u73VvMct3coBe5gje7gjncg9/n3Rq/wqx/yxQ3DAO5y99TvRPx3P33ywj6gNrkeOUb3Sa93R
DROaCHrSX5zOYnzQg/uzSz3WidzAHrFGuwAMNHueA1uwSb25dcBPBUAKNdEDSODZCyDakXza
pbqNWRvbv3LbUZESOjTcq3zcvzjZrz3bO511vBOHFHwfQP3d6Tne+fzc3/ILHbE2LjxjgW2u
qb3cCfvfM/MLm93enaaOezaQO7vazX3e59BTolJ5Udp6Kl7hLx4DaSMl2TxpOT5rrd3fQR4B
34u7J1FPNfySpOfeOXOGUWA6z7tnVc7EiTMNakH1bV4u4Ttmo3qReX4cUeVosKXmAbG/GXbW
HADA/ktYwOcWBrrKsNJ9EOc+4qOTuJeb1BH4LZkAA1Hx2zd+pm+5Z1P+6jE+66My3L1+xk+N
6ocg2zWg5h3+29sdlGH+qFuZbuOT4e++7dk9sBWdq5vWocFeCbC+29GTOMC98N394KVemgmc
nQ+QHzNghOQp8vV98uHd77dWHxOAH/MAZzhf2j+f379e9CGs9NPzD1Kf1VefteWcMI6fBDsQ
QvddV/vd54OGunAf2gV/pHRWfl1Ma31H+9wHeCUif7N2+8/UU5Od5SAXW9Xde25d+BIdE9ilcf
mj1+uLEf651d46N/h1X/ZJW/DZIp+zH/+Qm/+69cW+Ve5vk81wFe+8kf/v4Nf/Z7H+WhEWgU
OAGpdguhEoEaSYAzpAo5VYnW6wxkDMduV/mCK1OHQzbO9Gg11a6QumAEGk8AmbgxnVAplYrV
cnmFfY2VnaWttaUYDBUFJAAoRRzopcRMVfUMjAAKDhKSyYwMILLFLA4dRDwmBXhQ4lxYYlpt
dn6C7YSO1uqcMgqoskpqZGAXfZpcm55fuqW8aqZogavJiTdTDpdWEzQLt/iiUu2STvtWC2NL
HmQ8WUo8wMC8NDSOtHCNkOebJ/6mugYgRIBtsbzFq1LvHj4WD1k8K9cLoLVHA7XBQqZDHj17
+Fo8DAmRBTRR/qgBU3fRqwYBGLp96/NiAEOQ/iJFtug3MdO1FCFusDQmaOK8eTOZ2bz58GOD
k+hS9rwT9CVCFUY95hOk1AXTBi9g/LMA1dXPqTCLdqz5cNBSfPZ6zHsgYUI1DVFdFaNK1OPC
jzuUgmLQwt5XGKYswMmg6sa6gpTOou3bcO3Nj9JKyKULbI5FdpViMaa9GYFrm69gqUGpyIk
ggY1Ukn7cWvbFiNQw5BLOW4dnxg/g7M1mXbXwirmIg44zDFwZbaafd1aPC5yA3HUtXrVPNNz
fZ9qE6Y+ATGGDJwbT3IHmzsz77hOnS6cmbx5D4xbGYSJCUY46ONKjiIfconNcZ9n7xAVmyYN
iPOeROeMR6B9djD3/k4yRnXnzCAAovVLeQVS+NoszjHkXkQ6nUPRYuh1NCJ7gIROokk7jcXi
drWOplVpawHoVYo8LSdiMi/6x1Zp+JjOwo814tfikDg2KONtX60hgYp02GhhcDnuwyEi8yV2
wIRN3tifiRs++A9PR5CppXNc/pcmSspBcuB6UBYpZYdAZnmnmRqG4eWSdOKX10YPEH1moHI+
ReiBF1AQU6KA5sKoine1Z2FRL/zZpaV8D1ShAZHSIhlInqKoZoOrObkRPfVwMtxalaY6J2sr
tXSMi1aIBtGOMQqqKqF15TXUpv2N51BODiF5ma3YEStUpAm9IJ17NoEzmFcvqEa9mY/jWt
pNU2MMssOZ3pFvm5DYXBZvdFe5er4r2F2A1EcatauVh591L4KrVow4tTCjGrrVJZCdKcxL
rsBb7VDcj6up5FqrMvVKm2mDDVBtboOGg6VvQm4pg6xKFffVAzpM8K6jQFO86bKVxaeyuxTH
GzOeioaUcrstSxjkY7DBsDO1oNT8MwUSGigqBU/2UG6UaOpkM9AfjrkwaON2GmetLC+NNZta
T/HgJvjo4yvVBgtbX29kk4i2hmoH+yymOv+JbqUFNOWjo6Lu2jUYPDpQLMg9ws41Bnus3GA
g34Lt8xei7KtOpvZ12fgjFN++JVjK15ynmt7DmSIeHPu4NeX/gpdZup6+v2txa7DqTrbdreu
6+K1ww554v1V1YnUoy+6Op9NqjcLX6+Tvueqd1rwpLVq9y7srWW1yhGyAxd/O+ICReum8DV5
IhI/MvTteO/RQobozuYP7rjzL5uFEKKy5SkSvrjhvo42xdrvKuaS1XCs44/5MM88QLgvGSD
Dy/caxeo6dbfttG+qzxMWb8yDdSQ9jzANdBUGoOPtmhOnQgwJlQki4OINcYUUsyjf77Rjvig
dDKaaUtAdPFWv4DSkhp2TTrxEQ99fpcrPzFVZtP5GX3OQybdiU5RtMohEZmmuQRzna8qKLY
TtecoiOjJ6fqnFMi1MU23akvRaLe/v1Kh7m3he5NfinNd1jwKSZJzmjo81Xdvtc6IDKPR82a
X+TimMVnSMwwjVLM3Wg3te45qzo4qA/oVnjI5sVOTJVEHe8wqb46RMKQRkOV91iHjZ/U4Id7
AMcfmkGpQpgBDedwAzAccco1NCEWUWB1F1z5npIcYpbVsGUrUlkJPmSi1YH4ZSiCmQhaNqIG
y8mDLrHoh14u8xnA1OUzhynNxjheVLgizJJwkxDcJMNOCTCNONJTQYAJ1+IF/5CrHNXqzT
livJ5Sr1cUOtjGZD9xRmLdvJv1UqowM16sLMHALLBqRTEQU1iw+FEk9ewkhv02JKOiWQz29m
h4GhwSZD/hsKS5oYpw1iiQMx1ZBKi4awKSazyXs46Ew2aCaaOzQpX3plrmd1EfdrCWW3NmE
CzowWSN5SDM7mk86hMColYhpBpVSuMFEFJoZOCoq+blLFmaMOKeBy1B1ekqgeFWeV8jCDQlG
xXYVIDnsHEZF36FWZTJUiG8FU3laikuhfDWZJAUUePg3IKxNM6OY9aU2rxoeJ1qxmGmVQEIH
e85YwgWyZ3SpYq1CD7y+cqDPpE8RQPfOwM4zJ9kUaFPxGUO4nvauvUxKY9Hp2omCs7OC7QQE
gSVadb42t8dc7GrjxxXB3FSiZpXscCvL28ueIaVxDZpw7UrckrLWtrNcKSWj/srZ5u6WsdnF
LEGjaVrd/1O8gfqtcudKodheN7StLe9cIZEDPJBgBTbYwwKcywDi8UO7a1gALW2wgiLMAAAA
yMEMwmkDWRSgv+EFMDQErAICL8LACFYwg1OpX/7618JksDCGDaDhGiR4wQ3074MZJuHOivi/
5B1wgQ+MYg6v+MNRWMD9XtDKGJ04xhtWRNOHGEFYeEjUqzwjC8s5BsDQAT4NXJ/wfhj+BGC
BTK+aY1PnGIpTwXEybzHf68VkhE3ucs2/nJFIRNiB2gwUBuDaCnUPGQG129eMDYzRJcscw6
eREYWDOOw41Ucs10yVdNc4G3agQAcKDDxXhwAO11/i69+bkDSqKxoA/sgQRHOseUDqFCL23V
LTs1wyvQAJRFIOo9PRYepkZZwbj85BnkIMpT3u+OWSjrtvbMLdU6mJ1bjVYqOxfY4PEYE01M
6AW3Wcx7/icOLadZR6e4wySA6YvXqoXRBXswzOZrfbIt6qHWeMKK/q+4ddjERxOZxbB+8yvR
HMxrF6jQ8u6lQn687iC/YdCl1TeyBavkeq06zrcmOK+Pr04YOQrgzr7zq/k97TCcOeHTKLa5
i9zwbvsb4W6RZbMFDmVtF/ziJ9KuYRZgRkpCGuUfp7fqJG4DmMc75d4uMBJt7UkbKNjVHpf2
zoHMaFVvGAVSHrrFi/7v/qNP/ORAIcAKPABE2xgAToAAQ0gYKbVjkEiEKABCHSwgA2Y4AMK
WAEBpP5Sq2Nd61z3enfArguxk93saFc720/eYKrDPetb7/rXsRt2nYy97GdP+9rb3nGqY+Dq
gp87rABhdwfgXfF7b7zfawB4yfMYBDCge6zgbPi7Iz7vi+e74wv9+bgPnu41yiZJUD+jxOud
8X3/Bt+rDvqNEL7uQLU9L3C/es6zOSiB1zvh7WF57DI19ZrXfet1XT8KSCD2ZnKoPTEvmL7h
XgKb3z2Orx+PcR31+VohifeTZPwNWID1nYd8N7D/APQ7fwuXv2rx8y5+xpsHvHXY51mA/eGf
/sB4wuHNiJMHxys2qe5XtXV3/kFzKw5VPv13/SxHgRGWe8FHgVWCO1YYG1MyftPn7F5nu/B
Htc5zAgyS9Lc3/GRn/VpgApOXvANkFIV1sfcnwRQQPwhH4e12QWsIA4+H63lkMrIxQ8mRvUN
oEVhn/bVneG9YBLmxhK+2+P5XgFSIOmpX/eFQr5coQ82kX1E4PI9gOiFYHvsn/RhId/lG5G9
3glyinBg3ulhICmYoPwBnRzaIPN5YT604e2p3vg5oQf+3twVngZ1gR1tJX+7JnxYunxSyIRU6
YuXwICQGoR90oiJOYQISXwPOAASMIROWxyGmYCcaof7hYeaZnSni/twA/iElfiEhEJ8eFiIA
xqEsqqIXsiIo5uEo5uIG9qHQzSEgFh4wuqIMouIxOuIvgEjMmOrzcANEMAJwNOsgIBgjUCZ
BUIXoB4DjAI3ldOpMN4JEIALpBgHhIALsEQ2XsI2XlM3/iI4ep840lM5psA5puM6zoA7YuMH
FGA8cqM3guPh4SM5ogM/qqOCccA/XqPVWYA2Cs8mGORB3uM4IoI+MqQ/ukBEXh1FzuNF2uOI
aaQacKTaoWNDAsBDfmRAmoBIr1UDkCRCnmQJpKQCrCTvvSQ8bp2VWaT+1Z5N5uNCqmQ/B11Z
wKRMYgE93uFBOqI4QhSV5OROOmSO1B9B/o6kYHwjUSqkOR41Sz5kRdVfA62VU36jQ2RkUcYA -continued BZzjhDgkRJ75ABpR1aGDFU5akYNxkObrlB9SHWMo13AFMWmSQV26kUWYAOt4AT4KkCTyNqxDm
COJDQh4mWOokASwmAERZOzYmPPRUW1IWbPYgiShr1ZbKkCPxEZxJkZLZVV+DGylimVW6mD/mk
PJ61ZJGa7oL4LEMomO5LlRGrlWRqkW4mmDjFhYiJlS/5jUJTl1hVkPY6BaxonYiSmBwBmTwrk
YAondIbjKLwmOlAniACAcmJnTF7CZ9Ikd66lQtLFWx7BeLqkajonDfiYCE4GRpokW+5jWEYV
eaqnbTalasGZ/kjk51fup2165H8+5x0O5Zy9BWnGZnLG51IGZ1PWJHzo5WNlRl8iKHwGZkhW
aFDipWHSgNJQ5wnYR4JS6Hxu54h2J1sep3j654oCqIh25YsaaNp113i6WnkypYOeJI5oEoq
Zn+yo4+GKFoG6XoOaUd6qDXS6ILeKJNCKJFKKA8AzpF5Yi95I+aNmCHgIggE2ljwAHxiqXbo
ipYGH5fqn5f+F5gKo5iWmHKUaUtiqQVBWH9t6be1GT3CaeKNKZ2aKXO8xI7dX9fNBJt6qZ+a
QZgGakXUKQfcaYtEWBquKUD16Zc2apw+qjBE6qQek560XqLyKeahzZtuKqDOKaQO/qqIqcCnd
KeqislsLDICjrqqn8uhPuKqeBh+DvOmiaipNcOqtrkKkYg9gvaomsKkg+imt4UIDPCpvfOoQ
2o88wGqyLmpO/CkMyO14QMUNfKpjwBQIqlGXMmqtDqtm8AsdhOtrVGsFfgTanKutahVv9KcI
gKpd9dcBxmu/Tmaqk12nFmuuZimvQoCp+Gu8EoaqrhOuziYNgRgLLsRMJazPxGDDDuzDq1Kv
7Wm8X1W/imEPequgtiT75KkK70mvVmzIZkbAMVIAhGuexUPKmuuIxUfikRtntOtjnMX90Y0y
YqubbpkecmugMY2R5it/+WwLfqqsDu2wNixc2mnBomzz/tWEksOr1JpOq1KqwQLtrPrrnwYs
scIg4Zq1V5r05qqwm4LDUAr2e7s2dJspqIqyOoSq07trqLtl9YsLr2IlsGYKr2err3tZq
OGYtwwouOlLt3AKr39IrKuxo3nat4caq0q5nGLse5bsxSu4zpt5gps2U4txHLspapt4o4t
xpKuZBlDIgrWc7wpqo5CUa7eiVkEN2Bx8HuNcnu7PaD7e4d7kKC7i5BDb6EY8pd7DID8Aav
Qt6ujeWuZOkXEWJfQvhu8wKvSQhv2hHveFKvDUieBEiAbdbD784u90Lv8Epv8YYv7JrNc2gr
7dbq+npv+46nUelX787kAAGv/uHU72FGrz6NZ1ft7woy77eJUU6YhFcIMPsS8ZAzlBf9iAfq+
KcfQWYnKxf9RF/gqgflh71pZsIzVLhqAxcqQ4QeY3PRyFhSSL1+cr/ampwkL8A9+wPcaL+9y
YayJZrzOcACTZvRyRn/gr/iuoFEsxNX2KwOHMQS3UwHvGgX38MoSxgPfLwHjygFPXgJTsbWt
zAA/sQRngBFvcfaKOQXn5riRb1/isBgnbxmLsAxrq/lKCBk6YAR/MABdb42O8PNu5BqTxwOy
MC6tAFVcLwzXqgzTb/dakQcTMhkvAQ873/wusv3e8M/15/sisBUkccL6cRNfsTRlMmdp8fJm
L8WC/qw9WHIbkzIks2gFK7JOygcksvIjzU3Ai8+kPezEgq3AADjLvbnIc53IlfwkgN3IOs9gt
97H6lvDiOjIwwzEsDzMJAzFO0vLk+oQtB7M0O+8nWzMYc24k+FApvzIudzMzg/Il4/HxkjMf
KzI1d686P7GKvSRdIgDHJrAM6PM+MzFOBhobChGWKjSeegSQCRIqe5vM+63M/a24KAHSH5i+D
9eQFGLSWJrRCM/Q/B3T+OnNEXoCx+Cx/SLNCL3Q1N/RDy+ZAf+g9FwBliV78cgJJo7M/YxhK
y7BBSAnSz61B7zjB+gOy140P9MEycXgDqmkdQqOioF1MXz0QZP1KctOP1/SOoRlH+IOAcA1
pCQIOeFyXZuOOa61V3dOQPo1BQaMT2P0YAe1Ux+21el0SDuMEuMDULuBTRu21EW1RXPyFKey
A6NkU6eO9YX1WLuzUrMtncUFad+OacM1ape1PhenfGyoZrf1fb01XUKKZO/1TwdwXGzoR3d1
bi9nXO/LXP92YzP1ZXA1inLgXs91XO8FYNuCYDN1UNeHGUbOSjOMY1d2UjM3Obo2dOu3ZBt1
ePfrTJ+OUJ+3WEs1LCdsbY/2Y5e2RBe1b4/0/j6nsW3PxRu4d2TDt34HNnB3jH8DDVfPgWHj
dODKNl0bODeJ7NIoOFgbd2cjNISP90YabYWbt4A/+HKbdXZnttrNwYc30HoT+HVHOIfbdzrq
dQdiuHLv94bXd4lDtkSfdnwXuI3TNI6XtqQSajdsQDLYpghvwgjU7iFwuC8ML96arRGTinIj
uZIvORoOeQw8ucMCAOWOseQZeSZUuZLXKpOPtpN7L5RTrgCQ8TekoZhXcJJfeQ9k+ZZnbJcL
+TaO0WVpz5jPeZ2nOZdHGaiSsZHPA52LJkQeQBzuJXYOel2Ob4yR6FPwZErVFPcRqJjOUpu
aKDf+WzqOZhXOpyX/rmS2ONPX7WYojnOQLrGsrmOU3mcW3mZa9qm9aCWBzq7djme8wC1Fvmo
W4GfOzqdj7ajezoo7Xqet4MhVzcYCTujnzmuq3BFEPGai28BNjt/LEQiL7qZ+zOa37CaK/ur
Y9l5wnCii2ZTeLuqS7SNqLmkh3q5A3tlp3tTVHGOP3qdRjqxkPuvx3qZ13u+aLAp5Puua6xQ
yPu/c3vtiuEYtsyx63vnXl9MWHqpdzuWC/duhsmnC/nEnX+pL/ywZzks2kU4rzmzg/ezrzvB
e+/k8vqkX524nPupzzqOf3u7W4PJjzuloywSB/yprzy4u7swVPvOw7ql/zx9jyHOC7rR/id8
xXN7vY/bhpKHuBP60Y08nNP61Gv8h3D81T991tf8ulM900S80/s71Gu9zbM7/B2twaN9mAe7
rF88sd/8k8topIN92ot93QN6uBO9waMmzIf93Fv8n+MP93ss9ndM94t+94hv8AGBJjoVKA
1s21111BnHcAlo/dt58dKlwm1E3+383lOlxv5js+53v+mYc+I4x+W3c55SvAOwieCnCE5nc+
rbc+6G+A6KMj867etS1sCbxKtbA+nbA+nX++qr8+DsS+wc++6dc+FGxA9vU8fa5+T90ZMPo+
8Fdf6XseNto+5r90tSi/und+D4wbGzx/9Es/8Vu/+VeB5ten/mjWOil+OxnCfvDLvq4BQY1w
UuAMqc1CpwKVaJBer9MZVBuv6AtWeqh0i03KgFOcCLUZQLOW3TweTfGYXDaf0Wl1MI1CYDAQ
LzAxMjO0tbUcN7gMjAskJSYnKCmqKr4eCJqSwC8Ki4tCAo8bRLWcGSGNxgsLCgmJBzvKvMuO
vs30wbGys1JTVCEinNbX2Ie/F6zavdvMXMEwXsM04NQhOcjjZOWXhu8GTE30aMLeQ10R6+G5
Q1auJACcyEzcpoMaQWHIoGGUx1Mz/t48LAbrIIySlprhIpdwZcs3MAEEGxLS2E073Uw6q1eO
14Y3vxARZSdyW9Ju4HYy+67kLn9RE67LRUYEMq7KB8P7YMOfN1FCX/sjO6oFWnloYKSVQaNvx
LdWx7gJSHPANr95PF1i6tSYsMElaOjFpyZtx70+o+cI6lis4ZOWmOFQqBkrqb9x2kPFIDtlV
Gkuophv3SyOxMmiebDnKnoo6Il3CW5sm7Ks5JufawJfmdopPaBvOj+YOXs5Vt/O3HHi4ObBC
wQcLKQp4nhjFvCZoXwqkQPBBwQoSEQLwyM4jQAQs3j8gsDABlsTyzHsmvQXWa++9+Oar7778
vkNAvEjM/grwPBoINNA9+OSjzxTtGNSPv/FIeqIbAdHr6kIENVwQvw/FGOmSPygxr5sKAREE
xQwV5NA+Fh2EUERKsKCQhsokKJA9DBPcEBEOQvDQxxABhELIGs8OYIDc1ySDSd7309HKQXM
wkRdcFTyLRFCuCGC7qAkT8YSrQTBMhRbiuCGLdVokjtWHozSjg1zsRBJBEkJYUWaLOjvPODh
HPJEQnM8dMcnwVvOKhgcFRTSLBOclEkeG/xyPEzhoZLMGyM9M51QW/yzBG5MLWjQTlVMROOv
/XwzC1P/KPLIWnXURO1GMBh1VzEz8VWvCRRNOlZQ+XREUf+ATHZAcmBpFjNo/tfosNhWLkUq
UGzLTAEzDwL41NtWpxXXrLPERFW9SKG6YVO9W3XwXV9lpZHWZ+9dUVRddUDqLFmXRQjYZ4Vl
t9KCAfS3IIyOzbLhPAHoMFcwGxUQryI12FYxLQd2FV15iQx5ZNjSzXhjgjt2gtx5RVaUNHtf
1vdYa50dl+GWBaaU41cr1LTcVGsVWp+dI/bYZzmTxhjNLmMumuao6Q024zQD8MBql0MEOEWH
2VjkEAFs+MrEjgGt8GO5zTXAxsEMMMFoWJygQANEDCWbVKZCBVUUFOdU+6784Zrb7TixC
EHAi/Gl05KbbbgLWfkvvIdJeGOIJBHeiX7grN/zy/sQ3X7xzx9ueGW5fAbEc8cwVR4Vxzx+v
I3LJJ6984fUOx1zzzdXBvfU/3U6qd9PpFT714mVi/fPkX/cdhECMXA+UulOiHS2zc3d9csqx
P737qFRXZCZWdBed/MKdRz39zW8H15Vq34e/+SOfzxys3hyvGP45BjLgl4vZDc92Mzge9Wxy
sGSUznzyo933rNFA92EvdsuL3QT7h7raqa4NGBzf2yijMDqlwH8WbMhMxFe9A1bGMhNITPdC
WD+QTIsCE3DH4AjXPJElBjYvURBD77fDBz7Aej/OYPBwFpQiMs4oBDwIvP7AxATGBoBhwSAS
C7jBE26hiSoEoQu2yLnG/lFPCVUE4warqDOyCBJKxe7MIoQ21RYIVznF4GfehGZgkA9A7
DR17uEQJBsJdLORiHOtIPv4VQJBajKIjYbi/MR6uNGcEgPEsecgDRjKOw+Pk7T65O0SWL4GE
TAcDT6k/SGayjIrbxy184fVCOqtsTHE6QARx8bdgMxOGQJjHlMD8YgDHPDAeZqULaH1UAD
D1mbBYZZzGMaM5nL/EAzDQHNfAVAGAIIpglcQUxUZlObulAmGb15BnBqzD7jLCcSOCk6dfKv
ncxOZjw7RE9h3vOWjw7RE9h3vOW+dymOwXgkmdmLJwAZds106nOgvLzmwqVpzg7VO+H4hOiuqChCkPRT4qK
/mA7/EAbRgXaBIKyc5k4OOBCRagmYQAzoNjMZkS72ZKc8XKkO2zETB9aU5Ua9AT2wtfD4JCo
c9IUmUGVqcC+KutDOucuLB0HpRgWxz27286kVZWgKpgrBpV6Vm+906eb+eVGflsWKChOrUOEZ
Uid1NaMDhRUK8+jWslKNO3OzqVK1qciVHPStvCQWT6dlT7/q8xOYGaxZ52nYcHlRoOBtG9xg
AxV/zrMoUqUiUqz6Bax6M6eOtWhJLfXVta6FqVn95lPatqGxiCJG8SIZUILUp2Wlpxp1SBt
3xhEZ5E1s74t60/4+lsa3mwxjV2QXE+aT9PlUbk4dVllunZvYgoIC/gfUxZNlORpb7K72nYby
LmvRa9x1Vpa18NyqSInL26pSFrRjxW3x4vrd8042rPPFazzT5Ab8zjW++13AbSequk4WNg07

-continued fdAGxqOEJahAwhPWwRcKFIb2eHNV6lNwT8Pj4AVAeMIjrnCIC4Bh1m64fqFCm7tALOIRS7jE
F0aShrv1FxYzGAkEWEYzzjE9fYbirGMYNM2+AHV1jCB6GwhYOc4SHfGBg5DiaSQ6zkGJcF
FgvoKJRPQOQpG1nHL8byj78AXAQoJsrxPMV28HNkJCTZxyR2chh+AhQ2J3hNJFhwleN85Tk3
2cQo3i5QIIY/Be9WUWQOtIzrLOShkhfB/jmDyNC4go5Z9kLj/ZyfA5d5Ddf2osvyjKQCb1m
Y2MvVs1D/XUiOuwIK8PYzLyerp260+lKrOLUPNQ2nWXdHpYYOtVDYfG4XQ1rc9O4O5JWn6OV
NWpdV3HT5O6xfLaq6jc7+935/q0EntzvPFM62N1WMsEtA1wLIHzdCg+4nxmdZb1AnDQZoHUi
bM3wRu+bu9JON2Yn/vE/l2vQ8r6pupdNcRLA+Kl5nSK6b3ihae8zPE+uI3V9XKUz3zbLPf5
urtWcWcWEDWtOm/p51tdXw36/J/Nk8P/WXnf70G/ApA2ozQEMLQEwIV9jCMQiyCQyAUGQpbipZ
t7QjLuB1sIt9xmRf5tkRl/ZlX8Rr4na7K3YYd7mHmO56tPua1R4WMXPd7xPwzwJ6PPeyF97q
ATi83gPOdbi72tU6gAXdVSh5vOcdFYn/QNfjDHjOG3sCG9gI2uVTebiQ3vQORv3caZiYf+
5TOQPdwBLXbBl/OCG7cX7NtwHw2kcfZf/z3k6063DBiak2vnTuOG7/uwO//zqLPX9BHf9guY
/u/NH3vkXRBA71S+5qwoxg7J/fjyP//ur8977C//gfYzXvMjSb3nzX5+2Bu9+1s+/gLaP205
sdZLtskLQN4bQOxLPc1jPAogvA9QQN1DsONzwNMjPBeTQNxTQNxTQA2gv7xrA6OzluWrvfg7l+Er
ORHcvRIcPlegPQ4smPOrQCNjv8UjILlLwf+bv6yrPwGMOc8xgBOOQCOhQfkzPCFsQCLE
vB0rQAOUwO2bP8prwt7bQCYwtsDhQuwQhzUQBnMvjPzQC9Mtwssoiwcwx4MvpUivhacNCdU
vgcMPCWsQgG4QSwUQ+YjQzfEQ6sLQtGbwyKSQ+C7wx9kwkFcwz5sQ0QEvTgUoRtgRBT8wORc
wPojwagrRC10RP+DxCusPzXZKwEogvigmzj7uhgguyBT/qEMU4AoYyTVSQC2MyxsQ0UHU0VW
DANX7CZYtDpZ3JwEMCJbhMEYLABeREZeNIFXjEXYU4NhdIFQw4C+2OHG28UU6EUycMb6gOYG
CjhTRAC2mUDGKOcP1MZfjI9gfItoBMcqw0VkjAFznMCbUYx0jIB1NV2JMJwhMdkRMB6pEac
wsdnBIB9RJt+zMZcXEVs9CjFuCxSKMg+EZ+fEeFjMVVZsZMZUgkbBrD9adAMixACLTEWG
1Eh0HDJSSL81GMa9agRW+zCMbEiO3EZgZElvlEYSeIi+u8hrpMlmBMaCPMhSJIbIcr+T7KiU
FMpuNEiKREiLJEdzZLxlvABf/uTGbiTKhDTJeZQ2XxwkdZTIpyzKU7zIf2S9gFyMsGzKUWy2
rVzIjGxFjhTIaSLIpnTJo2oEt/PHk5TLoCy+u6RInjRGcjzLjQxKdcRJp9RJqCRM9zNHv7xK
pszKsUxIqZxKeqzJe8xHRNDKklzIrgzIzRzKyvzMmVRGaXtIsLRymRMshRHs+zLZUQ3iOTM
lizNsjTJuJzNq5ymiAxM13zLO4xMm/Q0xfTM3IRLoJTMtWzNd0zO4eTN4mRNUcRN2NTN5ZxO
21SDtqxI6DTMpWzOrKzFVVAAtSk9E0DFbFP9Dw7unPM4jEvGtLnmIF9FTP9VSh/3vPFYjP
UAzM/r3ju+ELl/xkz/20AfgkAPlctmG8D76JPrcLF0VxhfDQT/dE0P5UOP+kTAC9Ae+wgQGd
OHsTUVD4AP7Oz4L0xg79UBPtOnMaUREdOHRD0aZU0QgYAha9zwKN0RWMPt/cUJBsQBwlzxZN
zwLdSLPrUe5STBsd0vN0OSO1UBNF0CWtUQAYxRv1UCLV0SNtzylN0N+sUbycJha9PvwOOAtN
OAVFsAa9UQE103OpUCRN0wxdO1kUUi2NUBFdT0Xx0hPV0BR1yhXd0q4T0cWygPYcPgylUTHF
OxyFOmw81Hr8QjUFOrxrUyctOjPdSC/cOEZlS7bLVC4tUD+1+AR8NQUt1/1DyjL4nNdIuPVAw
vYFAbdP6IFM5zc9SrVQmFdQs9Q5bndBPmNMvrdNUZVNHJVQSlVQLoNNP5dBeJVRX9SoSHdBF
BVQrxVQtbdVNVaFOnVFrbdRB1dYo9dOSw6xZPVZxfVVmBUxwfdZOJVVYrdOPdZRhVR4ZVZA
TyB2rddoxdV4bdYgDVdNHdd//VZQXN+3dZcJdZANi2cOsbCKbSMwCKrVgTxQEEHTJ4alhB
nQm+k9iKDdmLzdgv21gr9UaH4LsIDVmKHdlONNmTbVBVUNkBrdnwc1mNfSaO1VkC4EdqtFmg
pcaX1dmTFVQh4MeINVGgldGSIwGYvVbeO1qE/kzaia3YmhVI6kqXflY3anp1akGVZ98Ra31zJ
ouVZpP1alsXZSCPamOXas21RsFVbp6OBWS3bGViEt61akeOmkp3bYmVQrq1VtN1bjB3avzW
iyJCvRzQuOVbw93axPVa/Aa9yzcnD3cO43cUqTakLVZDOjbpwVXqd3cwbVY1WwJv+VYNdPc
8yzdlXcg8zMzBXGh00+0oXbtIXdkmVbqPWavNRL3CVc0OVdOe1aCI3Q8BPex7Vb1o3YpRO+
uQ1dAB3d1sXdoMWA5W3b5nXdszvdaZJeDqVezm3cws3a2WVHt5VcvbVY3SWBqIBC8eXe6H2m
XVXR+A1e9rXc3Tlf/n1M39td39fV39Rl3vsF4ModXv5FhNUtYLA94Ow9WUpbBAI4AA8txdbF
AQwuXFjszwNQUBfIM6ALABfw2AVTgAvOYATd4BPoYHwEYXATYTcVN70kSRQ2YQHgYA924XqD
4d+dYWqkxhS+4RXO4XULYWmc4F863h9e4ujDYXz8tqJVuCOm4BWwYBtY4h+OPpwi4qJVtSmu
YBOO2AzO4lN9g+rqYim+USq24gzG4CDe4ic4hf+4io04zbWYCE+AA9oYTneYTpm4zYOYif+
4D7GuT+24OC24UHWYUP22Do+YTdW5CHm4y5mNxhGYi2mxjsW5Ekcm5EpOYyR+ZCzG4OUu/uQi
O+QTZuI85mIOtg9UFuMaVoBTZeUodmU1BmNIJuUV3mNP7uL/GuFQBuRYXmVKbmXfUthjmQV
ZuFeruVLrs8ZTtuR1pmUItuVg9uEf5mRmZuRTvuVHFmMsbuJO5uYWe+VNTjc4buZqvuQ1RuRh
XoGxVWcrBeV2zmVtVlBSMOVy9uZk1uVt/jfRs+Z6hmVlJmZ5rlF6xmWC9mdqnmeBVuhNluRt
1udaY2eIlmaDJucpi9obJQEqrmIBCOkb5mCnjQCdpeiNPmYN+GiRDukVIGkFPelKbjOO7tn6
bOmRXuGSlumZprSa9ugk1uIFe2mdxmfKQ+la+2meAmmhbokD/tjpo55pdvvpj9Zil+7PseXp
T+YBqvZQkA5pcX7qmI7qnuZqcepolm5pohZrkybrre7ql8bptYbqGUBqj4Prr77qom7rupZq
nz7rnk1rkZ7rse7rssZuYZpvrZzmgbsneyOvM5pttbqVoZrodbryXbrynZswc7DDFBsyq5l
xFZrONZsOeZsr07svQ5tCJ5I1I5r0l5t067mhw3s1I7tzDbstxYnjxU3lc5txp5qzpZhqybs
xfZrs64BtL7tpl5pug7uv1Zu24btwcYpqDjuw37tyJ5rM55thx7twQZtWYXu5F5u6sZsugZo
ISzv6d7uOtbtzZZuoD5vyX5u5AZv/vQubPLG7/rWb6lubBeQ7p716AN4aqeN6Q+G7/sWYQEn
AQI3cAJAcO/e7ACPADhw8AKHcAlX80yu8Ah/7Gly8Ag3aaON7qRm8Bsd8AyfJpcw6Q+G4v/+
aw9X8QIX8QO38btG8Q9/cBt38Qk/7RnH8Bo/cB/n8NOOch4n8hpIcBwH8AZP8hFf8h+zZt5D
8gzvcSk3cgp/8itXcib/7xy38iGP8i8Hc+EWcwOv8iY/cy4f8xs3czZPcSFP8yxfcxlvczov
czAXqSrHcyzX8xhfXTT/8yn/7mPmhzkndCOHcuU+KhbP80JHaLNGchb/3jc38zuXcx7PakBf
8EEn8jeI/vSmzPQd73IyRz87n3Q/93JR70ZSp3FIX3Qq13FYV3Q7d+1PP3VZN/QA54daZ/Vd
n3UG9wDljgCTrgEpb3VDZ3BkN/ZjT/ZgP21mL/Zj94APVnZJ571pt/BnNyNsH3Wz3nZjR3Zo
X/MTF/duD4Bvd/VwD/BmH3dkv/ZoF3Z3p3Zyl3dzz3F0v3d1n/dlr3dn5/d1X29tB3h4L3c4
P3eDT/eBD+iCJ/eAj/d+z/fG3neJb3ige/h3Z3h/z3Z1X3iB73hw13h7v3iRZ3eSj3iET/in
a3eIP3h8Z/k2yzqLX3mW/2sRfoOSt/mEx/16N+OQp3jh3vc3iHmZ9/mX7/as/jt5gv/4pA95
9d7smjf6m3f5jQ96mR96kDd5oUf6q+f6rPf6naf6oO8Arp4BbVd3ykN7HtDXrE8EsOf7tO93
tnf7tx+KuEd7taf7urb7t8+BvJ/7te/7uz+FwN/7wW/7wsf7sxd8uVf8wgf8xkf8x/f7sD/8
va/8xZd8uaf8ut98zFd7zY/800d7yL97ztf7zP98Op/81Sf81u/81z/9vy/9xLf8snd90Wd9
1Lf90e993Td93L953+f92g/+2wd9rqb52R/+nsf8SUz+2Fd9tZdV2Ad+2d/9GQgB54fz1Hd8
47985P/9489+4Vd+85d+7Kf+859+8L/+xTf8BJj/cuGPf8Cn//oHffyP/OnD//wnfSBICBOA
ovGITCqXy9xQyIxKpOXnk4rNVp9ErTdqHX7HyjCUjN5eO2hzlzl2w8ny+bdu1+Lz2D1/6vcH
xiXYR1gIeIg4uLbI5Jbj+KgomRRYqSaGaUm5mXnmaXSJOYoVBAA7

Secondary+map image data for the zMap demo applet (Base64-encoded GIF image):
(filename: world.mmp)

```
R01GOD3AUyAPcAAAAAAAAbQAAmAAA7gAAhAAAxgAAsgAAigAAtQAASwAAoQAAzAAA9wDy
AAAA+DXAAAA5gAAfADNAADHAADBAAAA/QC5AACvAAClAACZAACLAAAAwQAFIgAA7AB7AAAA
rQAA2ABTAAA1AAAA8gAAiAAA3gAAtgAAkQAAEwAAvwAA1gAAlwD8AAD2AAAAbwDoAAAdgAAAA
yAAA8wAAYQAA4gAAeAAAowBoAAAApgAAPAAAOQAA/AAAUwAA6AAAAAAAAAAAAAAAAAAAAAA
AAAAAAAAAAAAAAAAAAAAAAAAAAAAAAAAAAAAAAAAAAAAAAAAAAAA////+AAP//AP/E4QD///9N
pv+53ECAgJubm2Zm/+bm////UZSUllAAgMCd6E6t1v/GjIYM/wC9AL29//8AALn/uUCVyECA
gL2Bvr256PsA+/+32wCAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAACwAAAAA3AUyAEAI/gChCBxIsKDBgwgTKlzIsKHD
hxAjSpxIsaLFixgzatzIsaPHjyBDihxJsqTJkyhTqlzJsqXLlzBjypxJs6bNi1Zy6tzJMyeV
n1eCCh1K1GHPoOd/UhEaJQpRoUaRst2pNGjTq06hMpzKVafSn1ivxmnYtawVpWGbPgTD1qzU
R2KBSQxJvMRAQ2VNTQ27moRoShN38Uuz16hEW4n1fMziPJgzmMxihkABggTdX5GDq5ySEpdl
zKA5z03s8ExoOIjdlj7D+jTq1FMfsp7t2IxrOaNjM5zN23Rj247TZJ4sdXdv3pjNACeTPrhj
4j2NHOdee7nz57Bzrp7e+zfw688b/nd2eJV7dzLKb+u1AhGreeroT0fW2/Due/jpM88HQz7s
mab30XabaAzdFUWA57nGX4EGIItidb5k99JcVVynlIHeYkaWYX0199dOF3UW14VVeWQiibyJy
ZeKFjSXUVxZXwWjgjDQ2VdRAU9WoY41BEdRFWVjJuKOOYwnWxZFuxSjkkHcNhGRlTS3JZBQ+
HmnllXVNCZiRV3b542BaEiSGGGx5aSWUUUi5JRRjijHGm29aYeaTfMOoZptuwjnXl2cmZoWa
VArkGJ55vtmZnyPiJWhmhcI5xqGI/qXWoqGx5SgYjOLqZ6BQQHiaXnpmSllOX9YkKcDgvqo
qKOaKhCq/gNiZ+mllMOZ3asCxvoapobONcacT+JqGny6YqZqqG/2qZ1AB5pX7K600trlQ069
9+xwmI4J55hHElRtgNdiRuiYBdnnYLhkjEvtjCeG2+a60oL4LLnMasmirvBq2SyCA+arb3n8
hubtwv2C6xhBFBJco7UH40ghoAp/S52TEVd8FRZWbrFFFFxY/K/GW2QMssdMggyyyCOTPKPJ
XbCsrKQqXyWGySFfqbGZiVY8JsOnA1uqYgn/S6jNPQN7lNDjiuGlyz6XqvGQSeNpJtNNtwxy
x3dFnfScVNvcpclYN9WY11pP3bXXVVNuNFaNkRwOszSjXfJVrbZdtds80RxFr/t1kL+OyyGhc
y7fdR/K8ReDojj140jw3hXjigy6OZ8oAQg6a5DunJaAaalie7uAFN+Zb555/njQUC7dWOtt4
oj5krqsr7rq9sHs++7//EdsY5/iqnLvqZMAqcMyaq//64Y4jfrx/x6HhPBrKL6+j1AELf2Q
UNCshRbXO0yjQFl483b2d32scPhdcbBH2+JzzynD766FNOPEGGq5/+1ffLr/BA9dMMv/95Ixib
+le/9+VPYwfcGPYEsjMC9s+AYDtgjRg4lLgcSMH75g9/9/90Lc97k2qbhZzOoPrsg26TTUpclAyh
4eLXOEqhcHAqdF/4NAYFVFXUkuhiYTiPPmtbgY6B5/sfbWw8dCAUg7tCG6YpcCnn2QyMGcW+X
IxvN1uXE58VOazSs11WqCMTVMS56YeFi4J7oLnqB8s5itGLixDAwJqVRjcXy17/eSMYISS+N
ZIAjGc60MjKq2iI/EE+MeAXk918qRfWECsAc9iMg1LbKRTSLIFCZJyUlebyFbqKQm54fJTGpy
kzr6qo4UQsBPenJ/pAyhKS3jpFTiUGOrnMIEEflk/n2Skos5yMxqactbyllhbdpCA3nJM18C
c3Iau8AFiGmyTypEcYQC2TCJOclnRpFxwwtxILRdCNylm04fWFCIWvynM+oWTh1GTpjkTcsQ1
prOcIFOIINOZzSswqxHHz/qTnzhiORTyia3IJoZEf3RXQ6dGxjhlaiJYOehqFRuyNCS1oxJwY
IYSMr4t/tCj7nudQPHaOkQrBJUgRAsrxUUSAHVFgKzliuB2NpH6zzEgMvSfTV1pmI8zcQkqJ
qZGcxrOnPGUpLznimKBmJDSvJCpSLdgRXRFQqc+ypOZsN9XSSZWRtVL3IFiHXEayOU2AhMRBC
QVKjOnJkSk/cyL8iipGIdfVfHOGpWuV6VbrihCdVyKte91qFp2illkfhq2D1+hSLTGWwfCC3s
XQOL2LwqFrA6yasVGpvYoWQksoKdLGIffSxGG8Slavmm1skTCyF8SGdq8lyshcKHtayS5Ltaul
/ixqMXvUxsjWtUfBSHUyM1iuVEQ5wAWuY3ybnIt4J7jD5WtxKTId5JKhsTvRSK6ci6lWvXYi
Oznucmyr1/FUJEHaVZBgLJJdD6BHuJ9qCOa4o4H25sdY9NFnvbKpwhiqY173vlRVbLtIbVUo
uPnFzYKYyxu+OgbA1V1sfQXLGwTDd8AT2QllDyzc6yw2J7L973s4x4tkJJ2c5hu1JhqkDnAtj
uLGt8Q3wTNZaCUMoInaxmF8RYhYZ/xVhdSKRvm7sMDTB1SCRgtlKDbKeSE2JyNnZC1CgRUUQg
CzmXBEmykx+2poL4ilVTTlRCHjwZ6/oYIentspEnZZBYiTnIBXGe/n7202S+IAR4sWJzm8uS
ZjXLRzIC11RuC4IhMqxhQPPRb1cMYjBA4/nMtyJIu3TVZeu+edGp8lWRNbqve5k5kVPeU2Lki
zSs2GiR1lg4zhNtYMHnZOVsHYVVkoK5VqfUGarYd83aoHWRDrEWzTtMZxwiCm6vsODMiEsdh7
CnIkSN6lSFh6Mi9l1JMoRRnSBlf4Zido5hBgWg+i7azBai0qtEpxnAdmrdr3Eq3eft2l2iZf
287dpWo3aXDsTpJIlJiOMTSK3d809tcYV297SwvfycaLmsUATTxF698A75bgxnVwOOGbPZCL
2rbcxC2/2QzO+iSUvaX2tZGpjnSwg/eO/gBk54jzrVvVykzJOek2LQKKszyE/ncuZ56yYty5e
hS4juaYUsIUTklO5j9XPd2Stle+ReDB3zdBvXXWlPB8a5FtreeKFubABVeo/qq3qTcjADBHJM
61HAwtUaZ2yetQzt+lseAc+OdvHFzIL5i5vbIzZNuBmu41cjWAXrVzizEy3y3tNPlm39t+s7+b
OEBDvHvf7b54rflhYRzYOML6PbIme7khP+b+xCoGtiTu52B5v4uok5YZM70q54fvfTC1WT89
3kb1hlJA643IctgHEJ+uF2fpaRjGMebR5jCcEUL/2bahD5/4g4q1fVAfu6WnBaNW9RhrmB/H
06qR9kFO/kPx/qq9iQKx+4Gk3vrAxpbxk59/sJwCyBh5SSYPU75HScz9Mm7KFDlq7IPWboeHs
71b890//9sMz/Md+MYV+tZRAGgN/NGWAr5RACJiA5DMQdVdLAEhAVcYmpudTXrCBxXRKnEJB
9eRT9VNJBQF5lSiCIDMFZRYagieCJTlggbcNMBnF8JohN4DQQuad77/RUBFFFJreDU9SDEJVx
ptdqBOWDLFhBrdZPDEV8wURqvXeE1Hca71IuBiWFNLiEQ4KFU5hrM7dQUlhRUFgxR/hrX9hH
82SFiERRn1Z11KOGWgc9kiRLYFcQWEOHxsYQJVUxEkEze6gvE1FMtwSlfZiCvlRJ/gvOEL1O
iCKFEVJwUw6hQozIShfYSa80iZVoibxESSn4U5GIgpnERBABiqIIEUVFilL1GfTmUxJBehMY
QhGhg6xHRKa4cMFEiw7hORmYigyRg2WUQ+2BeOiILxHhVbS3Og+BRj6ILhHhfMvYL824hRTV
UNElhsdohv2xfahXjGiIfzUjdy4PNUojsYEYf+VIjiGGWYLFWRwhYaLFY5d1Yrc1Wh9xW5VV
j/aoVyCRj45Fjzx6RjyPBjyQBkAEpkPvIj1XwEQCmHPbIHhuxkMBFXDoREsEFXRPZEQ3GkI01
EqzBAwbJEf0FkB4BPAiZkB4BPAiZkCBpGiUZEqxhj602ESPpkhzx/pL6GMyCZMaUZM2eZMv6RHyiFgR
mVcZtREtxIcAllc82ZM+iV4d4Y6D5WAfoY6C5ZQcxhXr6Fc3AhFmAVqEZZU9AmZWVlcKRGD
sVdAYZVeGSlleQVZMRG5kRhVoZZkthZTBhYVkR24xRUcoigS0WSz1RVNQSEUkWSfdZdHkzAT
EWbK5ZdxmYvqIZG68RC64pjLBZnF0peTuR2zgV68lZhIgV3TpZnGIh5edpGycRzVsVlcNpoQ
gSGqQ12imWQR4Wv4hZrQQZqY2Weu+ZrjFY4Mg1/YwhkOyZuy6VzXcRgRsSLTQV+f2RjgsV9i
iZzztZILK+V+fEo5fUWB5hZuo/ikZYkkhPvEh0pmd9TVl3qqghf1ki4Sme04lxQakhUoFiMNed
h4VYNeeF7okUBuZfplmeLnI0WJEwHgIUWKGWZtmfeHkXATOjlmWgQJIWHqKg8NhjWaJjQ3YQ
Y+YXURdJCTFn5PaXS3YQHJJpjBQiiITqhEchkJepjekmitelkkAhm1SVlInpOoYlnomFkNIoZ
m6Gbo6kaCbFykaGbpPGjuvMph6ZneOaktaMeR9qjOaWk+1ksYHCjl6losimlMgqlV3obQdqi
wVlnQceleWabbUhyYQoam4EY39h0vakexilPNNdzbvpR5oJrlTIXcAp08gJWlEZ0J4IqdIpz
```

-continued

Secondary+map image data for the zMap demo applet (Base64-encoded GIF image):
(filename: world.mmp)

dsqf/tWjMJamEPoWBReAoFTwH5oWnww6IeeJFR7iqC+HIQyalzFiYlcpoeDmMfAoohXTlU6i
onbloh5aoQJRJskGJmHiI4eBblnCay+6qmXipGBCq1bGK3GSZZKiJgZhcKyCq6K6mDXOHKHS
lm02JC/4YHqSovK2mAqSZOjqZorGaI2GKIQWLo1GrEnaKUZ3p9lqFlZapNiKaJNZn9yKrjzB
Z+fyZ1gqKmOQaFqOafBqZrz6b2W6p+E6K3niaWVqpnJ6aaOzho86sJ/yJnBII38Kg2bUfXUq
IAvba4MKa8KGsF7oOznXhllAq7RTn0AmdZhaJcrWPQSKbD+zIR3rsREz/lqyKilBw7KvSm3a
JiQy61LXljYp658wc7MaWjXV1rOAOG4Nmpc+C4LdZjTylqHvtjXnppizJHE097RQuyVac3Av
66p6SW9tgrUOCyUuxG/aEi1E625hCxoNdym/ArSxEa7YES35WrbRZTmzkrZT2zS44jl1a7c+
A6604bbitXEwMHEVdyX1Ajzs+YPm1gX1qq5EyHFfuKVOSCixhrHFQrLneLBJd7LVKGuW203g
x6Ztehuhq7lRqnSlWzyS+2vLwzCeIhBMSzLZBrqwG7sxkyBc8nVgdwVYcG2LR35RYDWtWnU1
UzTNJm3C+7V9sTyzKLe20yVJu3hK+61aIm4i/pNt7gY1Ttt3VOuf3rNuCbezORMWSWMB4xK+
rZoTjrdvn4e+pRIFlVeDdRO+hdcF5UGFqnc30tszemNDpcc1hWcyjwu+eFc4o604Itd2lUMG
IOculydybmcandPACLxuKtUsKudFdQNGtQ04+Bs1fESepaMunotxHsw64CfCiZO6s/u3z5KG
qpu4pNu6VydO7PM7Kka7YHcehQq8eHHBwIsxgFd2LHN7iOR3jWd+xFPEVGPEKnN3cOMlzPuK
cvc1z6u9t6h4cYMl/g092zt4W2x4QJw1BDx59dt4eDd3MPpPAaXzGUdx36INV+es3TBN68cu1
kkPHeNNS/Zt6/wt6/jeTd1FwfLDHcRbki378x4ZzjZxbyLfnexUMQ2o8jLIYgw1CyQ5bNwuD
GRNMwbV3c4IKK57MQ+mifdPXGE/OdOFSurlywnZOsSp2wjBcarTxRMczy2h1RF2Ey9oIBUrs
hrxsMdmTdT4sEAYEvMM8Qgj0y5e0QivUPeVTS9b2Spk3xmEyi2bXP9WMNK+IQ2h3zKM0TtrM
TAaCgTG4dtUMQOu3PWIjvOCYzZRHQqOXhIkXQxIEQ1RYcPUMd+BTRK7oyCEOyF34wLb3Vlz8
z6pnOEXOjJUsyfHEhND3yUvOhQxde3i8c844jWvEb5nbe3lOOGukfGKFPCD9wmSIOBU9/sNo
OIQ63D1NGMzSyIbkZ0gdvYZyCNNyxcyQFM3rTIDtx4BXUX8+zUkMCIAjlczOnD/myNP+Y0AP
aM2qGkIs9D8JdBdDDYm8NNX/I4D810tZflAbhEFcvRgnSExa/YAv+s7M9NSeNBBiW9bEBIAq
SBD0LM4ueLaJbIPb9EONfM43WNKv59c8uNCA3dBfDYxNxEWRnIFWyNKLrVNQ6NgVDNkZnU8/
aLDPJ9mXO7FXWIakK9I7woWOW9Nz1IQZdVH+hNnhx4agvTzfNxA6vVGwHdsm1drQ7H+cilc/
LX+eNEmwtNv+14FObFfOQOyodBAiWCOiVKsMiII4G9yk6NuZ/lTOwXrYKLiHujRM20xTxlTd
cC2CmnQQF93NzDTXK/jWuyiD4o3Q3w2L693Xes1UM4jJ423dQTjfiJzJjMN7COFPA+yJZarZ
8DOzeerZtrhPnC2MA9XIWljZC466Dd7ZDw5rqh3apt2etu1GLB3hK32MHF5I09SnayjiO20Q
1FjiBYGIKH4QvnR/DNHbgyjMnwjjMU7cCdFMk3jiz62JfpjjOk7drmRBPv7jH3jjm5jjmcjb
5c2IDrHdS+5MDJHeORXejPHAJkPeKsSY8itNTj7Y3PTBIYjliP3lDc3lXr5lOrd3/VPlwGff
vVjYfT3mmZbSOgfZ9QHRGq1za2qM/pYdR3ue2X10jX8uUIot6lMeOxGN4R9OMHl+56tNqBV+
YTwxCJQ+KKDGB2RFQ1szaIQ7bqtJUJHJF6S2hgQPBxzFW4TBuJJBCkzJbaszhOFKJLPGTmRK
Z1Spp2zJ1ktCaqRKa3TGq4weJOxFKKjH7sJGbtwasOyzcixL9PpKcYwCtASkhNjI5ROvcgy+
jvRGA+yut3TDuhTJkMrLOgzEdDzISrrHkAxFdfzJ+kHDUPxHhkRMCaNDjaTHxsw7i3ygjFxM
6avLwyS5ypS2+bvMwszDqVPHjtSOAATNONxM/iNbxYQMTSODSozMyZCMSaE8ZCMSaE8zc8ESTekzdpO
ydtszZjTzVScSVisydC5StjERDF4yH4OSflBZTtZSYS3OVKCReLaQedMQaWSXbebTS6Zt+MX
zqA016wMFfBEyvGcmPKMRpDbSu/sM69sTOOLPYXQgsrOPYXgAvrkRr8ssvzcuIXYAi9oyP4M
tP8ssgCFROVTCLgkTdLESwVNx9FUzVisr7n8S9UkzSzOpAoNScCM0EREKpNOzdGcSG8ETMCk
z/oUlYQYKBGVTA/tOC1IORVtsBatxI6UOLzzpUWEzBolOY6cAgxDzoHsUeLOTCEdUhFVCFUc
O9QMxYQITpykUScF/s4lFU6IhMkn5c5X5FHmpDIt1UA6tKLoKE/q7Mf2TE/B+y34zA4yxTK0
WsrOPM6Ryco43U7kWlPOqdORcU/wXI2Nu8rsZMJqDNT4vM+xXAgUtVGMe9CYyO9FnS6GaFRC
Q1G5LNB9jASKjalInbsAHdEYTVS33FTp61Rx3MtPfVQDs9RHZNDDNVERdVe2tDCvNFWhdFT
NSUBI9LNbFXsyxUWJVK7fMQHmtE2BFZC8wJkJbkpWFZpUk7FNFZJNaYjXU5ojU4dZVIkTVIl
rcArDUOl3c3D69Y6/NbglFOVpNbfXIg27Uk6vEcxjVMwXU4xHVN43VI1dbg6NVfLe1Og/szX
Kk2ygkJPf2XKeZlGf22j82TTegUUPr1Ofu0paixYbZQ9iQW5hWhLTb1YjA1VRl3WCYVUjlDW
LZiCRgXZhpBHLYjRvjzZVW3UTEWfjiBSUBWekC3MZK1DWM2V/QxNZCVVc7SlsQpRaK1Ljx3Z
qA1awqzWmFtWpp2ChhBXpW1ajnBWoa1WZvUgqq1aYMXaaX1W15xaKy3W2WyIf3VJLsU+soVS
di3WpOWIdY3S6HPXFpYbjXJJOJJPa1ba83OgZ3JgN3JvmXGv9XOfI24wYWag/2ohKXXPp3T
xSXP6TxcqXzPig00iq3cBGWIZdW93tlci22IpvVcB43ZkQ1d/tHNWNJVVqYNSEnyiEck2aKN
y1RN3cKMXcfKpYlOtU9XaDNXWNt2tLtXQTSWmA1Xc/1CDRM2t813o4QWws4xeVlWo/I2qh1
2rnBSKdD1x6dXmw927G9XtbkUeWdu44o2wQcSOLtUoZQlW7hNXpLziOtc27jdW+PBW56UX/UN
IzRd2+Dp1/3Nrf41lcIVzwBWmrwlo7sdH7ot4DpqXDwi1AYWRgaeLiVMYPecYLPkCKb1Tw1u
2kXtCONNS5YoMuPl3UObCkIr4Q2uI6dYWhVeYQ113VB8YSD9mhEWURrG3ZrVXRXWWd/lYRUe
CpNMXxwuYZv41S3AAGgNXZtQTkIj/uLatV7ujc1nheJxHYrureLxRdsmDtcqfsQurltq3eKh
OFdPFNsihd+bjNe2vRj7ZV+cpN8AflvhdGPAdWAdlBgDpuM7tWOt4eMHrl+DXWPHteAIxko9
puDa9GNFfruGyWBGr1SPMGERBmEPlmSWCOGVtYoU1uRQUwsSzmGYBeVOpuEatmFOxj5ThmFc
leEZXmXhdWXXNGUfptOifmGw2OIatVO5ZgmYO+VdvlqrgDyl7WVooeKtTZDTtOIr5o/wZeb3
HWa4nVIsZmMydgqq3NIObhhChrIhCcZu7kmnEOD77c6AIdxw3ii1+M5yRthxHuRsXudrROR3
nlwEFBOI/nXkcx7deubnSO4pq2Bl1AWLU+ZYu3BhSp5dwlBlgUblhWboSwYVKahlm3DD1Q3l
iI6OiR5WsJDHiy7lglZRUg5NXnZMxijmbUZhlM7FVC5my6gIl2YMmTDWlwaxGq3pZS5MmW4x
edxpccJSuwDXn2bpdxZqcbIMxjXji5JnhYVjxSkNyHXqPiaMP5bq6IFqrRRqpFYjcGWMkKJA
r55crK60rR5ofCbrbwbosZZohS4NvwyVjdbhOuhVU4nro3XrnV1aBLBrkZ7rOJwYt+7RWLUM
YOVovO5mwlZavK5WvJbVFm1sadvexi4QbcXrB9HpyVYcasbpF4pmyw43Y5bnr2HE62Ac7bCm
V3SCbMA9RsjmMm27JtbQhGSXUmba1E4LJWYMWl6jq66sZmYdj27d4Gbrc26N8ebNh+5FY+7v9E
KuXeYdm9m+P+WYpe7JNsblUFY+tm10+Nm/N7rzGbuvG70Ymg8pW7pLoae/2TC5ObyM9b/JN
b9b07msab25S7pHM4+KWP9DLbofM7fSuuqn2blOx7eZWGv9ubeEJZNWmWfZua+t26P9mbvtm
cLAICAAAOw==

An alternative exemplary implementation according to an embodiment of the present invention could use a small (30K) Tcl-based client applet similar to that described above which downloads and runs within the user's Web browser page but where the image data is not downloaded to the client computer but instead is remotely manipulated by the user. For example, the image data could be too large to download to the user. Such an applet would, for example, open a socket communications channel to a remote visualization server that stores and manipulates three dimensional image data. When the user makes a change to the controls in the applet GUI, such as to specify rotation around an axis, the remote visualization server would perform that computation on the data and transfers the resultant data display back to the user for viewing the result of the manipulation within the display frame of the client applet. The user could, for example, slice through the data at any angle and click upon any voxel on any slice surface to cause the associated descriptive text to be shown in the lower widow of the applet, for example in the manner described above. The efficiency of this type of system is such that object identification and response occurs in nearly "real time" with identification speeds of, for example, approximately ½ second over 56 KB Internet connections.

What is claimed is:

1. A method for associating specified program actions with locations in images viewed on a computer system, the method comprising the steps of:

displaying a two-dimensional representation of a multi-dimensional image on a computer screen, with locations in the two-dimensional image specified by values of first and second coordinates which are x and y coordinates specifying locations in a single frame of a video clip, selecting a particular location on the two-dimensional representation having particular values of the first and second coordinates which determines a multi-dimensional coordinate including at least a third coordinate value which is a time dimension of the video clip;

creating a secondary image map, having entries correlating to values of the first, second, and third coordinates, with each entry holding a pointer value;

when the particular location of the two-dimensional representation is selected, accessing a selected entry of the secondary image specified by the particular vales of the first, second, and third coordinate to retrieve a selected pointer held by the selected entry;

utilizing a retrieved selected pointer to access hot program actions associated with the particular location in the two-dimensional image.

* * * * *